United States Patent
Weiss

(10) Patent No.: US 7,640,196 B2
(45) Date of Patent: Dec. 29, 2009

(54) METHOD OF MAKING CAPITAL INVESTMENT DECISIONS CONCERNING LOCATIONS FOR BUSINESS OPERATIONS AND/OR FACILITIES

(76) Inventor: Rhett L. Weiss, 3767 Highland Ave., New York, NY (US) 13152

( * ) Notice: Subject to any disclaimer, the term of this patent is extended or adjusted under 35 U.S.C. 154(b) by 523 days.

(21) Appl. No.: 10/505,776

(22) PCT Filed: Feb. 26, 2003

(86) PCT No.: PCT/US03/05623
§ 371 (c)(1),
(2), (4) Date: Apr. 1, 2005

(87) PCT Pub. No.: WO03/073223
PCT Pub. Date: Sep. 4, 2003

(65) Prior Publication Data
US 2005/0171877 A1    Aug. 4, 2005

(51) Int. Cl.
*G06Q 40/00* (2006.01)
(52) U.S. Cl. .................................................. 705/35
(58) Field of Classification Search .......... 705/7–10, 705/35–37; 707/1–8, 100–104; 715/200, 715/700
See application file for complete search history.

(56) References Cited

U.S. PATENT DOCUMENTS

| | | | |
|---|---|---|---|
| 5,680,305 A | 10/1997 | Apgar, IV | |
| 6,012,053 A * | 1/2000 | Pant et al. | 707/3 |
| 6,182,014 B1 | 1/2001 | Kenyon et al. | |
| 6,253,192 B1 * | 6/2001 | Corlett et al. | 705/36 R |
| 2002/0052814 A1 * | 5/2002 | Ketterer | 705/35 |
| 2002/0062277 A1 * | 5/2002 | Foster et al. | 705/38 |

OTHER PUBLICATIONS

University of Wisconsin-Milwaukee's article "The Economic Impact of the 2001 Wisconsin State Fair", Jul. 30, 2002, retrieved by Examiner from http://www4.uwm.edu/ced/publications/statefair.pdf, Jan. 14, 2009.*

* cited by examiner

*Primary Examiner*—Mary Cheung
(74) *Attorney, Agent, or Firm*—Millen, White, Zelano, Branigan, P.C.

(57) ABSTRACT

The present invention relates to methods for facilitating capital investment decisions and transactions concerning development, expansion, consolidation, location, relocation, merger, acquisition, and/or disposition of business operations and/or facilities using computer interface inquiries. The inventive method allows a user to select and compare business locations based on demographic and/or economic criteria and to optionally determine financial factors associated with operating a business in selected locations. In particular, the invention is directed to a method for deciding whether, where, and to what extent to invest capital for the development, expansion, consolidation, location, or relocation of a business, business operation, or business facility. For example, the invention provides a method for selecting locations for expansion or relocation of a business operation or business facility.

16 Claims, 18 Drawing Sheets

DEALS
Development, Expansion, and Location Solutions

Sample Project Demonstration

Index

This Sample Project illustrates how the system may be used to evaluate the attractiveness of a location for a medium sized manufacturer.

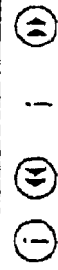 Start i. Index
1. Change or Create New Project
2. Project Guide
3. General Information Company Details
4. General Information Project Specification
5. Business Scenarios
6. Business Scenarios Edit or Import Scenario
7. Location Search
8. Candidate Folders
9. Candidate Folders/Ranking
10. Candidate Detail
11. Detailed Calculations
12. Community Benefit Report
13. Financial Summary
14. Candidate Ranking by Saved Criteria and Total Cost
15. Conclusion

FIG. 3a

⌒⊃DEALS
Development, Expansion, and Location Solutions

Candidate Ranking by Saved Criteria and Total Cost

This report combines the ranking based on the Saved Criteria with the total post-Incentive cost.

The user can adjust the relative importance of each of the criteria.

The user can also adjust the relative importance of Total Cost versus the Saved Criteria.

Details of the ranking algorithm can be displayed.

Details of the cost structure are also available.

△ Continue...

*Magnified view showing:*

Sample Project Demonstration

| Post-Incentive | | | Total Cost |
|---|---|---|---|
| Total Cost | % Diff | | |
| $148,782K | 5% | | $149,127 |
| $149,078K | 5% | | $149,744K |
| $148,004K | 4% | | $148,128K |
| $141,934K | 0% | | $141,972K |
| $145,512K | 3% | | $145,695 |

Show Detail

| Logout | Help

FIG. 3n

METHOD OF MAKING CAPITAL INVESTMENT DECISIONS CONCERNING LOCATIONS FOR BUSINESS OPERATIONS AND/OR FACILITIES

BACKGROUND OF THE INVENTION

The present invention relates to methods for facilitating capital investment decisions and transactions concerning development, expansion, consolidation, location, relocation, merger, acquisition, and/or disposition of business operations and/or facilities using computer interface inquiries. The inventive method allows a user to select and compare business locations based on demographic and/or economic criteria and to optionally determine financial factors associated with operating a business in selected locations. In particular, the invention is directed to a method for deciding whether, where, and to what extent to invest capital for the development, expansion, consolidation, location, or relocation of a business, business operation, or business facility. For example, the invention provides a method for selecting locations for expansion or relocation of a business operation or business facility.

Within the business community, the term "site selection" in general is used to refer to the process for selecting a business location (i.e., the jurisdiction in which the business is to be located) and/or a site for the business (i.e., the parcel of land itself, with or without buildings or other improvements). Herein, the term "capital investment transaction" or "cap-x transaction" will be used to generally refer to transactions stemming from capital investment decisions concerning development, expansion, consolidation, location, relocation, merger, acquisition, and/or disposition of business operations and/or facilities. Choosing a location and site for capital investment in a business facility or operation, so-called "cap-x" projects, can be an arduous task. Small to mid-size companies may face this problem only rarely, perhaps once during the life of the company. For such companies, capital investment decisions involving location and site selection decisions can be crucial to the future of the company. However, due to the rarity of the situation, the personnel involved in the candidate location and site selection process often have little or no experience in making such decisions. On the other hand, larger companies may face cap-x projects often, perhaps even once a year. Yet, whatever the size of the company, site selection projects involve the analysis of enormous amounts of data requiring a great deal of expense and the allocation or reallocation of valuable resources, particularly in-house personnel resources.

In addition to the companies themselves, Economic Development Agencies, Economic Development Authorities, Chambers of Commerce, and similar commerce promotion organizations (collectively, EDA's), and related service providers also get involved in these cap-x projects. While, as noted above, companies may face such projects infrequently, EDA's may get involved in many such projects during the course of a year. Each EDA may face stiff competition to attract or retain such projects and will need to emphasize the advantages of its location over other locations.

The process of deciding where, for example, to expand or relocate a business, or deciding which of several business locations to close down, involves the gathering and analysis of data on a wide variety of factors. These factors understandably include physical aspects of the prospective locations, for example, their proximity to municipalities, relevant markets, and transportation routes such as highways, rivers, railways, and airports. Additionally, there are important economic and demographic factors that should also be considered, e.g., local and regional taxes, local and regional regulations, the cost of utilities, and the size, education and skill of the local workforce.

Further, in selecting locations, the decision maker should consider not only the present day conditions, but also how these conditions might change in the foreseeable future. For example, while a particular location may be a superior candidate for relocation/expansion based on the estimated cost for start-up and first year operations, projected increases in costs for taxes and/or utilities could make the candidate inferior in comparison to others. Alternatively, projected demographic data night indicate that the location site will be unable to handle planned future work force expansion.

During the course of such cap-x projects, selection criteria may change dramatically. In other words, the data, project specifications, decision choices, decision criteria, and business projections that go into a capital investment decision-making process are all very dynamic. Any one or more of these may change, and they may change once or frequently. Under traditional methods, a report or other work product of internal project teams, outside consultants, or other hired professionals is rather rigid, static, expensive (in terms of human resource allocation, time, and money), and, thus, is not readily adaptable to changes. The traditional methods' work product thus becomes "stale" very quickly once a change occurs. Redoing that work product to update, adapt, or otherwise modify the data is an expensive process, one that might need to be repeated over and over again. For example, initially a company might seek to have a location which has close access to a major highway. But, then, during the course of the project, the business model changes and the new focus of the search might be to have a location which is as close as possible to an airport. As a result, the project team may need to completely shift direction and discard weeks or even months of research and analysis.

Thus, the process of investigating and comparing business locations is a complicated one. In light of the large amount of data to be collected and evaluated, the need to consider changes in data, and the need to take future operations into consideration, the process is often cumbersome, confusing and expensive. Further, in the early stages of a project, its viability is often uncertain. For example, after the expenditure of much up-front human resource allocation, time and money, a project may get placed on hold for long periods or even be canceled. As a result, a company may be reluctant to invest significant resources during the early stages of the projects. However, because of the complexity of the project, it may not be feasible to perform sufficient preliminary investigations without allocating substantial resources.

Also, the data available on different locations may come in many different forms. Under traditional methods, performing apples-to-apples comparisons of demographic and economic data, other locational attributes, and financial results from various decision choices can be difficult if not impossible.

In the past, a company faced with such a capital investment project could set up an internal project team to perform the data collection, analysis, and investigation to arrive at a list of candidate locations and available existing business operations, facilities, or other sites. Alternatively or additionally, a company might hire consultants to assist with these tasks. In either case, the scope of the information to be collected and analyzed is enormous and there are numerous choices to be a made in performing the analysis. With outside consultants, associated costs may become quite high since such projects can easily continue for months or even years. On the other hand, due to the enormity of the task, internal project teams can often be quickly and easily overwhelmed. The resultant disruptions, discontinuity, and/or productivity loss from reallocating valuable internal personnel resources can be quite significant.

SUMMARY OF THE INVENTION

Therefore, an object of the invention is to provide a method which quickly and efficiently provides a list, based on selected criteria, of competitive locations for a business operation or business facility.

An additional object of the invention is to provide a method which quickly and efficiently provides a list of competitive locations and capital investment transactions for a business operation or business facility, with the choices on the list being ranked and scored according to weighted or unweighted decision criteria, regardless of whether the list is based in whole or part on selected criteria.

Another object of the invention is to provide a method that screens data from a database of potential locations using one or more selected decision criteria and provides a comparison of the data on candidate locations for business operations or facilities.

Another object of the invention is to provide a method of estimating the relative costs of doing business, for example, start-up and operating costs, for business location and capital investment candidates, and optionally comparing the relative costs of doing business associated with these candidates.

Another object of the invention is to provide a method for comparing business location or transaction candidates, relative to each other, in one or more business scenarios, e.g. sets of capital budget, operating budget, utilities and other input consumption, and/or employment projections.

A further object of the invention is to provide a method for comparing (or "what if'ing") candidates for business locations and capital investment transactions under various conditions with respect to changes, real or hypothetical, in, for example, business plans, market conditions, project specifications, cost structure, economic incentive packages, statutes and regulations.

An additional object of the invention is to provide a method of site selection for business development, expansion, consolidation, location or relocation which is more efficient in terms of time and costs and/or more flexible in handling changes in data, such as economic and demographic data, than prior methods of making site selection determinations.

A further object of the invention is to provide an EDA with a competitive benchmarking tool to compare its location's attributes, advantages, and disadvantages to those of other locations and/or to model real or hypothetical changes in the location's attributes, advantages, and disadvantages.

A further object of the invention is to provide a method for demonstrating and presenting the competitive strengths and/or weaknesses of a given location and the competitive strengths and/or weaknesses of other locations with respect to a capital investment project.

A further object of the invention is to provide a method for determining which types of companies or industries would fare well if they were to start doing business, or continue to do business, in a given location.

Another object of the invention is to provide a method for competitive benchmarking whereby a company can compare its cost structures against those of its competitors, and further to model real or hypothetical changes in those cost structures.

A further object of the invention is to provide a method for determining, in a downsizing or consolidation scenario, which one or more operations or facilities to close down, which one or more to keep open, and/or whether new or expanded existing operations or facilities are in order to replace the closed ones and/or to augment the remaining ones, and where to do so.

Upon further study of the specification and appended claims, further objects and advantages of this invention will become apparent to those skilled in the art.

These objects are achieved by the inventive method for selecting, comparing and/or analyzing business locations and capital investment choices, utilizing a software program and database.

In accordance with one embodiment, the inventive method comprises:

(a) Selecting a geographic scope for the search for a potential location (such as the United States, Eastern United States, New England region of the United States, Maine, etc.) in which to make a capital investment in a business operation or facility;

(b) Inputting a data set containing one or more search criteria of demographic and/or economic data and one or more search criteria of demographic data and/or economic data for screening potential locations (e.g., unemployment rates and other labor force statistics, proximity to airports or interstate highways, tax rates, percentages of white collar and blue collar employment, quality of life factors, etc.);

(c) Screening a database containing a listing of possible locations within the selected geographic scope (e.g., a listing of all counties within the United States) with a set of criteria regarding demographic and/or economic data associated with each location to determine which locations satisfy the search criteria; and (d) Displaying a list of candidate locations that satisfy the search criteria.

According to a further aspect, the invention further comprises:

Editing the list of candidate locations to: delete one or more locations; add one or more locations selected from the database (irrespective of whether they meet any of the search criteria); and/or input new candidate locations (irrespective of whether they meet any of the search criteria).

According to a further aspect, the invention further comprises:

Saving the list (edited or unedited) of candidate locations, along with their associated economic and/or demographic data, in a Candidate Folder.

According to a further aspect, the invention further comprises:

Creating a Candidate Matrix which displays all or selected locations from a Candidate Folder and their associated economic and/or demographic data in a side-by-side format.

According to a further aspect, there is provided a method comprising:

(a) Inputting a data set containing one or more demographic and/or economic criteria and one or more search criteria of demographic data and/or economic data for ranking locations (e.g., unemployment rates, high school graduation rates, and/or proximity to a sea-port);

(b) Creating a Ranking of Candidates for two or more of candidate locations contained within a Candidate Folder according to how well each location satisfies each of the individual search criterion;

(c) Displaying the candidate locations in ranked order;

(d) Optionally displaying an overall cumulative score and/or score per criterion for each candidate in the ranking wherein the scores reflect how well the candidates satisfy all of the criteria and/or individual criterion;
(e) Optionally displaying the overall cumulative score and/or score per criterion of each candidate in the ranking based on a weighting, selected by the user, of each of the individual criterion's relative importance in the decision-making, e.g., from most important to least important, and/or
(f) Optionally displaying the score each candidate received based on the relative importance of the collective search criteria compared to the financial result.

According to a further aspect, there is provided a method comprising:
(a) Inputting a data set containing one or more demographic and/or economic criteria and one or more search criteria of demographic data and/or economic data for ranking locations (e.g., unemployment rates, high school graduation rates, and/or proximity to a sea-port);
(b) Creating a Ranking of Candidates for two or more of candidate locations contained within a Candidate Folder dependent on how well each location satisfies each of the individual search criterion;
(c) Displaying the candidate locations in ranked order;
(d1) Before performing step (b), selecting the weighting of individual ranking search or selection criteria; or
(d2) After performing step (c), selecting the weighting of individual ranking search or selection criteria and repeating steps (b)-(c);
(e) Optionally displaying an overall cumulative score and/or score per criterion for each candidate in the ranking wherein the scores reflect how well the candidates satisfy all of the criteria and/or individual criterion;
(f) Optionally displaying the overall cumulative score and/or score per criterion of each candidate in the rankling based on a weighting, selected by the user, of each of the individual criterion's relative importance in the decision-making, e.g., from most important to least important; and
(g) Optionally displaying the score each candidate received based on the relative importance of the collective search criteria compared to the financial result.

According to a further aspect of the invention, there is provided a method comprising:
(a) Inputting a data set containing one or more demographic and/or economic criteria and one or more search criteria of demographic data and/or economic data for, searching or selecting locations (e.g., unemployment rates, high school graduation rates, and/or proximity to a sea-port);
(b) Screening a database or a Candidate Folder containing a listing of candidate locations with a set of criteria regarding demographic and/or economic data associated with each location to determine how well each location satisfies the search or selection criteria;
(c) Generating a ranking of the candidate locations according to how well each location satisfies the search or selection criteria;
(d) Optionally, editing the list of candidate locations to: delete one or more locations; add one or more locations selected from the database (irrespective of whether they meet any of the search criteria); and/or input new candidate locations (irrespective of whether they meet any of the search criteria); and
(f) Displaying each candidate location and its associated data relating to the ranking and, optionally, listing the candidates in a predetermined order (e.g., sorted by ranking).

According to a further aspect, the invention further comprises:
(a) Inputting a data set containing one or more demographic and/or economic criteria and one or more search criteria of demographic data and/or economic data for ranking locations (e.g., unemployment rates, high school graduation rates, and/or proximity to a sea-port);
(b) Screening a database or a Candidate Folder containing a listing of candidate locations with a set of criteria regarding demographic and/or economic data associated with each location to determine how each location satisfies the ranking criteria;
(c) Generating a ranking of the candidate locations according to how well each location satisfies the ranking criteria;
(d) Displaying each candidate location and it associated data relating to the ranking criteria and, optionally, listing the candidates in a predetermined order (e.g., sorted by ranking); and
(e1) Before performing step (b), selecting the weighting of individual ranking criteria; or
(e2) After performing step (c), selecting the weighting of individual ranking criteria and repeating steps (b)-(d); or
(e3) After performing step (d), selecting or changing the weighting of individual ranking criteria and repeating steps (b)-(d).

According to a further aspect, the invention further comprises:
Inputting user identification information (e.g., company name, address, type of industry, etc.) and/or specifications on the capital investment project (e.g., utility usage, size of land parcel and/or building, budgeted capital investment amounts, workforce composition, etc.).

According to a further aspect, the invention further comprises:
Inputting at least one set of project specifications (e.g., size of desired building, size of desired land parcel, workforce size and composition, utility requirements, proximities to airport and highway, and the like), and/or inputting at least one set of business scenario data (e.g., sets of capital budget, operating budget, utilities and other input consumption, and/or employment projections).

According to a further aspect of the invention there is provided a method comprising:
(a) Creating a Candidate Folder containing a group of candidate locations and their associated demographic and/or economic data by screening a database using one or more search criteria, or by manually selecting candidate locations from a database, or a combination thereof,
(b) Before or after (a), inputting at least one set of project specifications (e.g., size of desired building, size of desired land parcel, workforce size and composition, utility requirements, proximities to airport and highway, and the like), and/or inputting at least one set of business scenario data (e.g., sets of capital budget, operating budget, utilities and other input consumption, and/or employment projections),
(c) Selecting one or more candidate locations within said candidate folder and one or more of said business scenarios for use in financial calculations,
(d) Performing one or more financial calculations on the selected business scenario(s) wherein said financial calculations are selected from:
Direct Community Benefit Report;
Indirect Community Benefit Report;

Incentive Package Report;
Best of all Worlds analysis;
Detailed Financial calculations; and
Financial Summary calculations.

According to a further aspect of the invention there is provided a method comprising:
(a) Selecting a geographic scope for the search for a potential location (such as the United States, Eastern United States, New England region of the United States, Maine, etc.) in which to make a capital investment in a business operation or facility;
(b) Inputting a data set containing one or more search criteria of demographic and/or economic data and one or more search criteria of demographic data and/or economic data for screening potential locations (e.g., unemployment rates and other labor force statistics, proximity to airports or interstate highways, tax rates, percentages of white collar and blue collar employment, quality of life factors, etc.);
(c) Screening a database containing a listing of possible locations within the selected geographic scope (e.g., a listing of all counties within the United States) with a set of criteria regarding demographic and/or economic data associated with each location to determine which locations satisfy the search criteria;
(d) Displaying a list of candidate locations that satisfy the search criteria;
(e) Optionally editing the list of candidate locations to: delete one or more locations; add one or more locations selected from the database (irrespective of whether they meet any of the search criteria); and/or input new candidate locations (irrespective of whether they meet any of the search criteria);
(f) Saving the list (edited or unedited) of candidate locations, along with their associated economic and/or demographic data, in a Candidate Folder;
(g) Inputting at least one set of project specifications (e.g., size of desired building, size of desired land parcel, workforce size and composition, utility requirements, proximities to airport and highway, and the like), and/or inputting at least one set of business scenario data (e.g., sets of capital budget, operating budget, utilities and other input consumption, and/or employment projections);
(h) Selecting one or more candidate locations within said candidate folder and one or more of said business scenarios for use in financial calculations; and
(i) Performing one or more financial calculations on the selected business scenario(s) wherein said financial calculations are selected from:
Direct Community Benefit Report;
Indirect Community Benefit Report;
Incentive Package Report;
Best of all Worlds analysis;
Detailed Financial calculations; and
Financial Summary calculations.

According to a further aspect, there is provided a method comprising:
(a) Inputting a data set containing one or more demographic and/or economic criteria and one or more search criteria of demographic data and/or economic data for ranking locations (e.g., unemployment rates, high school graduation rates, and/or proximity to a seaport);
(b) Creating a Ranking of Candidates for two or more of candidate locations contained within a Candidate Folder dependent on how well each location satisfies each of the individual search criterion;
(c) Displaying the candidate locations in ranked order;
(d) Optionally displaying an overall cumulative score and/or score per criterion for each candidate in the ranking wherein the scores reflect how well the candidates satisfy all of the criteria and/or individual criterion;
(e) Optionally displaying the overall cumulative score and/or score per criterion of each candidate in the ranking based on a weighting, selected by the user, of each of the individual criterion's relative importance in the decision-making, e.g., from most important to least important;
(f) Optionally displaying the score each candidate received based on the relative importance of the collective search criteria compared to the financial result;
(g) Inputting at least one set of project specifications (e.g., size of desired building, size of desired land parcel, workforce size and composition, utility requirements, proximities to airport and highway, and the like), and/or inputting at least one set of business scenario data (e.g., sets of capital budget, operating budget, utilities and other input consumption, and/or employment projections);
(h) Selecting one or more candidate locations within said candidate folder and one or more of said business scenarios for use in financial calculations; and
(i) Performing one or more financial calculations on the selected business scenario(s) wherein said financial calculations are selected from:
Direct Community Benefit Report;
Direct Community Benefit Report;
Incentive Package Report;
Best of all Worlds analysis;
Detailed Financial calculations; and
Financial Summary calculations.

According to a further aspect of the invention there is provided a method comprising:
(a) Selecting a geographic scope for the search for a potential location (such as the United States, Eastern United States, New England region of the United States, Maine, etc.) in which to make a capital investment in a business operation or facility;
(b) Inputting a data set containing one or more search criteria of demographic and/or economic data and one or more search criteria of demographic data and/or economic data for screening potential locations (e.g., unemployment rates and other labor force statistics, proximity to airports or interstate highways, tax rates, percentages of white collar and blue collar employment, quality of life factors, etc.);
(c) Screening a database containing a listing of possible locations within the selected geographic scope (e.g., a listing of all counties within the United States) with a set of criteria regarding demographic and/or economic data associated with each location to determine which locations satisfy the search criteria;
(d) Displaying a list of candidate locations that satisfy the search criteria;
(e) Optionally editing the list of candidate locations to: delete one or more locations; add one or more locations selected from the database (irrespective of whether they meet any of the search criteria); and/or input new candidate locations (irrespective of whether they meet any of the search criteria);
(f) Saving the list (edited or unedited) of candidate locations, along with their associated economic and/or demographic data, in a Candidate Folder;

(g) Creating a Ranking of Candidates for two or more of the candidate locations contained within the Candidate Folder dependent on how well each location satisfies each of the individual search criterion;

(h) Displaying the candidate locations in ranked order;

(i) Optionally displaying an overall cumulative score and/or score per criterion for each candidate in the ranking wherein the scores reflect how well the candidates satisfy all of the criteria and/or individual criterion;

(j) Optionally displaying the overall cumulative score and/or score per criterion of each candidate in the ranking based on a weighting, optionally selected by the user, of each of the individual criterion's relative importance in the decision-making, e.g., from most important to least important;

(k) Optionally displaying the score each candidate received based on the relative importance of the collective search criteria compared to the financial result;

(l) Inputting at least one set of project specifications (e.g., size of desired building, size of desired land parcel, workforce size and composition, utility requirements, proximities to airport and highway, and the like), and/or inputting at least one set of business scenario data (e.g., sets of capital budget, operating budget, utilities and other input consumption, and/or employment projections);

(m) Selecting one or more candidate locations within said candidate folder and one or more of said business scenarios for use in financial calculations; and (n) Performing one or more financial calculations on the selected business scenario(s) wherein said financial calculations are selected from:
Direct Community Benefit Report;
Indirect Community Benefit Report;
Incentive Package Report;
Best of all Worlds analysis;
Detailed Financial calculations; and
Financial Summary calculations.

According to a further aspect, the invention further comprises:

Calculating and displaying estimated costs of business start-up and/or costs of ongoing operations for candidate locations within a Candidate Folder.

According to a further aspect, the invention further comprises:

Ranking, weighing, and/or scoring candidate locations within a Candidate Folder based on financial cost, weighted search criteria, and/or relative importance of criteria to financial costs and displaying the result(s).

According to a further aspect, the invention further comprises:

Inputting changes in business scenarios, project specifications, and/or economic data and calculating and displaying estimated costs of business start-up and/or costs of ongoing operations for candidate locations within a Candidate Folder.

According to a further aspect, the invention further comprises:

Performing and displaying a "Best of All Worlds" analysis wherein the best, or lowest, cost attributes among candidate locations are highlighted and aggregated in a summary to show a hypothetical location that would contain in, one place the best cost elements that the candidate locations collectively possess.

According to a further aspect, the invention further comprises:

Generating and displaying a Direct Community Benefit Report that shows for a selected candidate location and for each year of a selected business scenario, the income tax, the revenue tax, property tax, sales tax, and the total thereof (i.e., total direct benefits), before or after incentives associated with the candidate location are applied.

According to a further aspect, the invention farther comprises:

Generating and displaying an Indirect Community Benefit Report wherein the user inputs a community multiplier, for example, 7.0, and this value is used to generate an Indirect Community Benefit Report which displays, for a selected location and for each year of a selected business scenario, the total wages and the "multiplier effect" or beneficial economic impact of these wages on the location.

According to a further aspect, the invention further comprises:

Generating and displaying an Incentive Package Report that shows, for a selected location and for each and/or all of the years of a selected business scenario, the credits, reductions, abatements, or other assistance offered by the location selected with regards to income tax, property tax, sales tax, training costs, labor costs, utility costs and miscellaneous other costs for each and/or all of the years in a selected business scenario, in terms of actual costs and/or the net present value thereof.

According to a further aspect, the invention further comprises:

Performing and displaying Detailed Financial Calculations which combine a selected business scenario with a selected candidate location's economic factors and which displays, for example, (1) individual costs and the overall costs of doing business associated with that location under the selected scenario (e.g., the costs of capital investment, income taxes, revenue taxes, labor, property taxes, utilities, sales taxes, insurance, transportation, training, other miscellaneous costs, and the sum thereof), wherein the displayed costs are calculated on the basis of before and after any the application of any incentives associated with the candidate location, and/or (2) the resultant net income or loss for each year of the selected business scenario after applying the overall pre-incentive costs and post-incentive costs, and optionally the cumulative net income or loss, based on pre-incentive costs and post-incentive costs, for the entire time span of the business scenario.

According to a further aspect, the invention further comprises:

Performing and displaying Financial Summary calculations and comparisons and, optionally, generating comparison graphs (e.g., bar graphs).

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
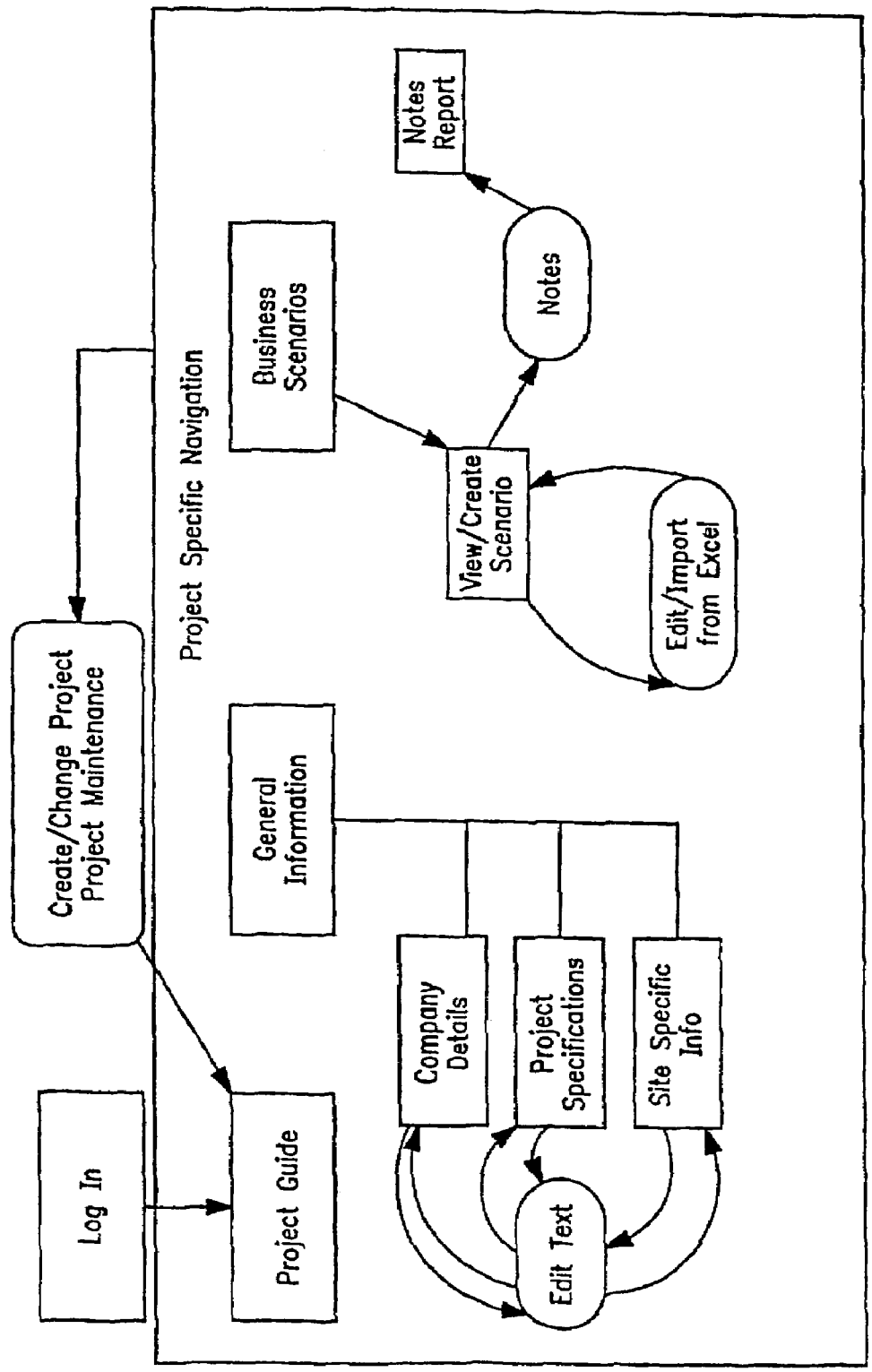
FIG. 1 illustrates a general flow chart of the system functions for creating a "project," inputting General Information, and creating one or more Business Scenarios.

Optimized selection of a new business location is typically beyond the expertise of most management personnel. An easy-to-use computer system for rapidly and accurately making such a business decision would preferably have "user-friendly interface" and feature simple query-driven forms or menus for entering desired business data parameters. Such a system would incorporate local infrastructure costs (i.e. taxes, constriction costs, and utilities) and available amenities (i.e. nearness to public and private transportation terminals) both for the present and the future. Having a system with such characteristics would provide a user with the ability to generate a list of business decision choices, determine the optimal choice, and create supporting reports as to profitability and usefulness of a particular location. Further, having a system with the ability to create "What if?" scenarios would provide the capability of using both input and output data ranges for comparisons in the decision making-process. The inventive method provides such a system.

The inventive method can be used by companies, economic development authorities, or their related service providers for projects that involve development, expansion, consolidation, location, relocation, merger, acquisition, or disposition of business operations or facilities. Just about every company during its existence will face one of these decisions at least once. Conversely, EDAs get involved in many such projects each year, as do related service providers. Because these projects are often capital-intensive in nature, they need to proceed in as productively and cost-effectively a manner as possible, to aid the company in competing successfully, both domestically and globally. The inventive method enables the user to, among other things, perform initial investigations into such projects in a very cost efficient and flexible manner.

The method can be used for any number ways to facilitate capital investment decisions including: data collection, management, and analysis for capital investment projects; overall capital investment project management; business location and site selections; competitive benchmarking for companies and/or EDAs; comparative financial analysis and modeling for alternative business decisions; and offering, tracking, and measuring project negotiation deal points.

Due to the method's flexibility and its ability to handle hypothetical scenarios, the method provides a useful tool for negotiations in selecting locations and their component transactions. Any party to a capital investment project (e.g., a company or an EDA) can use the method to determine, for example: (a) whether the costs (e.g., property taxes or other attributes) with respect to a particular transaction or location are more beneficial, less beneficial or comparable to the costs or other attributes of other transactions or locations; and (b) what would be the resultant effect of individual and/or cumulative changes in a transaction's or location's attributes stemming from negotiation offers or concessions.

In an exemplary process, if the user is interested in finding a location for building a new factory somewhere within a general geographic location, such as the United States, the methods of the present invention provide the user with the ability to quickly and easily arrive at and generate an output listing of candidate locations (e.g., counties) based on one or more specified demographic and/or economic search criteria. This is referred to as the Screening procedure or process. Once this list of candidate locations is generated, the user can then create a group of candidate locations for consideration is and place this group in a Candidate Folder. This is referred to as the Selection procedure or process. For example, the Candidate Folder may contain: one or more selections from the list of candidate locations generated by the Screening procedure; one or more candidates manually selected by the user from the database; one or more candidates created from other candidates (e.g., copying an existing candidate to create a hypothetical candidate with some or most of the same attributes, but with one or more hypothetical or proposed different attributes such as lower utility rates); or combinations thereof.

After creating the Candidate Folder, the user can then rank the candidate locations as to how well they satisfy the specified search criteria. In performing this ranking of candidate locations, the user can weight individual criteria.

In addition, after creating a Candidate Folder, a user can then utilize the inventive methods to perform financial calculations for each or all of the candidate locations based on one or more business scenarios created by the user. Such financial calculations can provide, for example, estimates on property tax, property tax incentives, alternative property tax, income tax, income tax reductions, utility costs and/or transportation costs. Further, these financial calculations can be determined over a series of years based upon projected scenarios set tip by the user.

The inventive method can also provide a listing of general financial calculations for each of the candidate locations. The calculations can include, for example, business scenario-dependent, business-scenario independent, location-dependent, and location-independent capital investment, workforce, utility, transportation, supplies and tax costs. These general financial calculations provide the cost before and after incentives for each of the scenarios presented by the user.

Overall, the method involves several general sub-processes or procedures, i.e. data input; location screening, location selection; candidate ranking; and financial modeling. These procedures, which are described in further detail below, can be performed in a variety of combinations. For example, location screening and/or selection can be performed without performing candidate ranking or without performing financial modeling. Similarly, location selection can be performed without performing location screening. Also, while some data input is needed to perform location screening, location screening can be performed without inputting other data that is needed for financial modeling or for simple user identification. The procedures can also be performed in various sequences, for example, financial modeling can be performed before or after candidate ranking.

In accordance with an embodiment of the invention, the user is prompted for specific criteria (demographic and/or economic) that are to be used in the screening and selection process. In response, the user enters the search criteria, preferably using a computer keyboard, touch screen, or a mouse. The software then performs a screening operation wherein a database containing a listing of locations and associated demographic and/or economic data is searched based on the selected search criteria. The user can then create a Candidate Folder containing one or more of locations derived from the screening process and/or one or more manually selected locations. The software also allows the user to input one or more business scenarios, before or after creating a Candidate Folder, and then perform financial modeling calculations on candidate locations within a created candidate folder using on or more of the created business scenarios.

The software can be installed on a user's computer, e.g., on a hard drive, on a zip drive, on a floppy disk, or on a CD ROM drive. Preferably, the software is made available to the user's computer using an "applications service provider" approach by the user's accessing the software, via an internet connection, on a cent-al secure computer. In particular, the method utilizes a web-based project management and decision modeling software system which exhibits the following features:

A database of locations and associated economic and/or demographic data (e.g., a database of all counties in the United States);

The capability of inputting data on project specifications and/or projections of a company's alternative business and financial scenarios;

The capability to screen the database using demographic and/or economic search criteria to generate a list of candidate locations;

The capability to rank locations according to criteria selected and, optionally, weighted by the user;

The capability to calculate relative start up and operating costs for specified locations;

The capability to determine the bottom line results for the different decision choices;

The capability of determine optimal operating environment for a particular business operation or facility.

The databases that are suitable for use with the system will contain a group of locations, preferably within a certain geographic region. For each location, the database will contain a set of demographic and/or economic data. In the discussion below, the example database is one that contains a listing of counties within the United States. Other similar databases could be utilized, for example, a database on locations within North America or within Europe or within New York State.

The database of locations and associated economic and/or demographic data should be secure. That is, a user should not be able to alter the data within the database. However, once the user has included one or more candidate locations in a Candidate Folder, the user is then, preferably, able to change a given candidate location's data as desired. This will, for example, permit a user to update the data for a given candidate location or to simply fill in missing data. Also, a user can use this editing capability to examine a candidate location's attributes using hypothetical or negotiation-derived data.

Using a computer, a user initiates the software program that may, for example, initially present the user with a Project Guide which will permit the user to quickly move from one procedure to another within the software. The software can prompt the user to create a capital investment project by setting up a Project Folder or to select a previously established Project Folder. If the user decides to create a new Project Folder, the user can start begin by selecting from the Project Guide the option to input general information. Upon selecting this option, the software prompts the user to input data concerning three classes of general information:

(1) Company identification information;
(2) Project requirement information (or project specifications); and
(3) Business scenario(s).

See the flowchart of FIG. 1.

These three classes of information can be inputted in any order, e.g., business scenario data can be inputted before inputting company identification data. As discussed further below, the system also preferably prompts the user to input other categories of data, such as demographic and/or economic data that is missing from the main database (i.e., to "complete" candidate records as described below). Other optional aspects concerning data input are the ability to create hypothetical locations (e.g., by changing the attributes of an existing location) and the ability to assign "weight" to factors selected by the user for ranking locations.

The "company identification" data set is used to identify the user for the proposed project(s). The "project specification" data set includes general preferences as to definitional factors or parameters for the project (e.g., budgeted cost for the land, estimates on utility usage, estimates on workforce needed.) The user also can input site specific data, such as minimum and maximum site sizes, building size and dimensions, desired zoning, desired start date of operations, and comments about the desired site, among other details. The third data set is the "business scenario" data. For this set of data, the user creates one or more business scenarios for the proposed project by identifying capital, utility, workforce, logistics, and other costs, needs and requirements that may vary by or be dependent upon the location, and/or that may be necessary to complete for cost projections over at least one and preferably several years.

The "company identification" data set generally includes information to identify the interested entity. This information is optional and is preferably stored for reference purposes. The general information in this data set can include, for example, the name of the company, the type of business involved (e.g., manufacturing, importing, services, etc.), the company's current address and contact information (e.g., telephone number, telefax number, e-mail, etc.). Additional identification information can include, for example, the standard industrial classification codes (i.e., SIC code) or similar such classification codes (e.g., The Northern American Industrial Classification System Code or NAICS code). The SIC and NAICS codes may be important as some states apply various incentives to companies in certain SIC/NAICS codes. Preferably, the software provides the user with a listing of these codes. While this data is mainly for user identification, storing this data in the Project Folder provides a convenient repository for relevant information regarding the project. For instance, a user could consult the project folder when an EDA asks the user for its SIC or NAICS codes because some local regulations and/or incentive programs might be dependent on these codes.

As noted in general the "company identification" data is optional and not required for other processes within the system. However, some data from this set can be used in other procedures, particularly financial modeling. For example, the "home" state and county for the company can be required for performing some financial calculations in order to establish a baseline for labor costs. In other words, this "home" location is the location upon which the employee information used in determining labor costs is based. In short, the system uses a labor cost index from federal labor statistics. When performing financial modeling, to reflect local variations in the payroll of a business operation, the software can, for example, multiply each candidate location's specific index number by the company's projected labor costs, which costs are derived from (i) the headcount projection in a given Business Scenario multiplied by (ii) computer-calculated prevailing average wage or salary figure for that company based on the workforce categories, employee numbers, and home state and county-based wages/salaries that the user input in the project specifications section.

The "project specification" data set includes certain general preferences with respect to the prospective location. For this data set, the user is prompted to input data on the proposed project, preferably with regard to at least three categories: budgeted investments, utilities, and employees. The budgeted investments category may include cost estimates for land, buildings, and machinery and equipment (M&E), and training. Budgeted investments for land building and M&E may be utilized by the user for establishing a baseline to be used for the business scenarios. This information is not required. The training budget estimate is the expected cost of training or retraining the workforce. It is preferred that this value be inputted by the user as it will be used in at least some calculations in the Financial Modeling procedure.

The utility category of data includes estimates for utility usages, e.g., expected monthly electrical usage (kilowatt hours) expected electrical demand (KVA), expected monthly gas usage (CCF), expected average monthly water usage (gallons), and/or expected average monthly sewer usage (gallons). The utilities information is not required but can be used as a reference for creating the business scenarios and during the search for specific locations.

The employee category is preferably broken down into different subcategories of employees, e.g., management, supervisors, operations, and support. For each of these subcategories, the user can input an average annual wage for the group of employees and the number of employees needed in each group. The ratio of the four types of employees generated in the project specifications data set can be used to calculate an average pay rate. In financial modeling, this average will be multiplied by the number of employees determine the total employment costs. In financial modeling, the software utilizes a location cost index algorithm to establish the local employment costs for each of the candidate locations based on their prevailing local rates, as opposed to the prevailing rates in the company's current location if different. Thus for, subsequent financial modeling it is preferred the information be inputted for at least one employee subcategory.

As a fourth data category under project specifications, the user may input general preferences with respect to the location of the proposed project. For example, the user can input preferences with respect to the state, county and/or city, desired proximity to a metropolitan area, desired proximity to an airport facility, and/or the desired proximity to a highway system.

If any data from this or other data sets is required for, e.g., subsequent financial modeling, this data can be indicated by the software with, for example, an asterisk or other appropriate symbol.

Other information that could optionally be included in this data set includes site specific information such as the date whereby the site selection decision will be made, the date on which groundbreaking on the site is intended, the date on which the site is to be operational, the dimensions of the site, whether an existing building is intended, the size of the building, whether railroad access is required, etc.

For the "business scenario" data set, the user inputs projections for income, employees, the investment for land, the investment for building, the M & E investment, gas usage, electric usage, water usage and so forth, for each scenario and for each year of the scenario. The business scenarios data can be used in the Financial Modeling procedure to accurately reflect the cost of doing business in any location under a particular set of business projections. Because many outside influences can affect a company, influences which are often beyond the company's control, the software program permits the user to enter multiple scenarios that reflect the nature of the business under varying business conditions. For example, optimistic, pessimistic and/or realistic (or most likely) are typical scenarios to be considered. In addition, the scenarios preferably reflect a period of years rather than a single year. All projects, and many incentives, generally have a multi-year life. Thus, while each scenario may be set up for only one year, preferably the user inputs information concerning several years, e.g., the first five or ten years of operation.

In creating a business scenario, the user is prompted for several categories of information. For example, the user is prompted to input a discount rate (i.e., cost of money to the organization in teams of a percentage) and the federal tax (expected federal tax liability as a percentage of income). These two pieces of information are required for subsequent financial modeling. To accurately reflect the capital expenditure, revenue, and expense streams, and the true value of any incentives, a discount factor is applied to all cash flows and incentives.

For each year of the scenario in question, the user also inputs general information concerning the operation of the facility. This information includes, for example, the year, total expected sales from the business (e.g., in dollar amounts), the total number of employees, information on capital investments (e.g., land investment, building investment, M & E investment), monthly utility costs (e.g., gas, electric, water and sewer), transportation costs and other miscellaneous costs. The first year of the scenario should be the start of the project and, this, the first year of the business scenario often reflects initial capital expenditures, other start-up costs, and initial incentives.

As noted, the user can create more than one business scenario. For example, if a user wishes to investigate the effect of a lower discount rate, e.g., 6% as opposed to 6.5%, the user creates a second business scenario using the lower discount rate. Alternatively, if the user wishes to investigate estimated sales increasing year to year at a higher or slower rate, then the user creates a further scenario changing the total sales for each year of the scenario.

There can be several ways to create a new scenario. The user may name a new scenario and then build the scenario cell by cell by inputting the appropriate values for each column. Additional rows (years) can be added. After a scenario is established the user can edit an existing scenario to revise that scenario, can create a new scenario from scratch, or can create a new scenario by initiating a "Save As" function and then providing a new name for the existing scenario. The new scenario can then be established by editing the original values. In addition, a user can create a scenario using a commercial database software program, e.g., by exporting to the template from the software to Microsoft Excel® and then use the Excel® formula building and other functions. The calculation results file can be imported back into the inventive software. The creation, viewing, and editing aspect of the Business Scenarios function are illustrated in the flowchart of FIG. 1.

Once this general information is inputted, the user can then initiate the Location Screening procedure. See FIG. 2. Alternatively, the user can go directly to the Location Screening procedure before inputting the Business Scenario information or even before inputting any of the Company Information and/or Project Specification Information. As noted, these basic sets of data can be entered in any order. However, before financial modeling can be adequately performed, the Business Scenario information should be entered. In addition, preferably all of the general information is entered before financial modeling. Further, as will be discussed later, at least one Candidate Folder containing at Least one candidate location should be created before financial modeling is performed.

Location Screening is the process of narrowing the search for locations that might meet the needs of a business. In this procedure, suitable locations are screened from the database based on demographic and/or economic criteria. The software prompts the user to enter select a geographic region (e.g., all of United States, the Mid Atlantic region of the United States, etc.) and then to enter search criteria for the candidate sites. For example, the user selects which demographic and/or economic criteria as search criteria from a general list. This list consists of at least some, if not all, of the demographic and/or economic data associated with each location entered in the database. The search criteria are then used by the software program to search the general database of locations (e.g., all states and all counties and possibly some, if not all, cities within the U.S.-in Virginia, the cities, are independent jurisdictions analogous to counties). Locations may be screened based on adherence to any combination of criteria within the parameters of the database. The user can modify this listing of candidate sites by further redefining criteria, adding further criteria, or eliminating criteria.

The search criteria can be divided into two sections, i.e., demographic and economic. Preferable, the search criteria are demographic in nature. However, the search criteria can be economic in nature or include both demographic and economic factors. Preferably, only a demographic search is used for candidate selection. Utilizing economic factors, taken without the underlying application of those factors, can be misleading. For instance, screening based on property tax rates without factoring in the assessment ratio may give misleading results. However, there may be situations in which searching using such factors is appropriate.

For example, in terms of demographic search criteria, the user may input criteria concerning the labor force at the state level, such as, the percent of elections won by unions over the past five years, the total union elections conducted over the last five years, and/or whether it is a "right to work" or "employment at will" state. On a county level the user may input search criteria concerning general demographics, labor force, quality of life and/or transportation. For example, with regards to general county demographics, the user might input as search criteria total population (for example, $\geq 500,000$), a projected percent population growth (for example, at least 0.5% over the next ten years), the median age of residents within the county, the median income of residents within the county, per capita income within the county, the net migration, the percentage of high school graduates the percentage of white collar workers, and the percentage of blue collar workers. With regards to labor force on a county level, the user might input search criteria concerning, for example, the unemployment rate, labor participation rate, and the percentages of the workforce employed in construction, transportation, communication and public utilities, the wholesale trade, the retail trade, the financial sector, insurance sector, service industry, and/or public administration. As for quality of life at the county level, the user might input search criteria concerning, for example, crime index, annual rainfall, annual snowfall, cooling degree days, heating degree days, and whether the county meets federal standards for levels of carbon monoxide, lead, nitrogen dioxide, ozone, particulate matter, and sulfur dioxide. Cooling degree days are an indication of the annual cooling requirement for a location and heating degree days are an indication of the annual heating requirement for a location. The cooling degree days for a particular date is determined by the sum of the date's high and low temperatures divided by two. This value is averaged for that particular date over a certain time period (e.g., 30 years). If the average is less than 65, it is a heating degree day but is not a cooling degree day. If it is more than 65, it is a cooling degree day but is not a heating degree day.

In addition, the user can input criteria concerning for example, transportation at a county level such as number of miles to the nearest interstate highway, number of interstate highways within the county, number of miles to the nearest commercial airport, number of miles to the nearest seaport, and number of seaport within the county.

Regarding economic criteria, again the user may input a variety of information specific to the state and/or county. For example, the user might input criteria concerning tax rates such as the state income tax rate(s), the percentage of federal tax payments deductible from state income, state revenue tax rate(s), state personal income tax rates, state sales tax rates, state sales tax rate for manufacturing equipment, and state property tax rates. In terms of labor force at the state level, the user might input criteria concerning, for example, the average cost of worker's compensation and the unemployment insurance taxable base. It is also possible to input criteria and data concerning statutory incentives such as the state training incentives rate. Also, during negotiations, the user might input data on negotiated training or other state level incentives. On a county level, the user might input information concerning, for example, the real estate tax rate, tangible property tax rate, and/or local revenue or license tax rates. In addition, the user might input information concerning the utility cost on a county level, e.g., the industrial electrical rate, the commercial electric rate, the natural gas rate, water rate, and sewer rate, as well as county-level statutory and negotiated incentives.

The screening process can be modified any number of times to narrow the choices to meet the user's requirements. A search can be created by selecting any of the desired search criteria and inputting the desired search criteria values. The user can change the qualifiers ($>, =, <, \leq, \geq$). The search can be conducted by requiring of that all or any of the search criteria. The software then screens the database and displays a list of all locations that met the search criteria. At the bottom of the list, there can be a display that shows the number of locations for which the search criteria was missing. After conducting a search, the search criteria can be saved to a folder. A listing of all the criteria used for any saved search can be displayed by clicking an icon. The saved search can be modified and re-run to expand or restrict the original results.

As noted, the search can be conducted using various geographical parameters. Thus, the user can search for candidates only within selected regions, for example, the southwestern United States. Alternatively, the user can request that the search be performed only within a specific area, e.g., a specific state or county.

As mentioned, upon completion of the database search, the software displays to the user a list of candidate locations, e.g., a list of suitable counties within the United States. For each of the candidate locations, the user can request details on the candidates and the software will display to the user all the data (i.e., whether from the system database or data manually entered by the user) on the state and county level with respect to all possible criteria. In other words, if the search was performed on only one criterion such as a total population within the county of 500,000 or less, the details on the candidates displayed by the software will include not only the total population of the county but also, for example, the real estate tax rate for the county, corporate income tax rate for the state, the unemployment rate for the county, the annual inches of snowfall for the county, the number of interstate highways within the county, etc.

Once the candidate list is generated, the user can then choose which candidates to be included in a Candidate folder. For example, if the list generated by the search included candidates in Hawaii and/or Alaska, and the user was interested only in sites in the contiguous 48 states, then the user can choose not to transfer the candidates from Hawaii and Alaska to the candidate folder.

In addition, the user can add to the Candidate Folder locations that the search did not turn up. For example, the user can perform a separate search but limit the search to a specific county. The displayed results of this quick selection would be one location, i.e., the specified county, which could then be transferred to a Candidate Folder.

One preferred procedure for setting tip the entries in the Candidate Folder is to use a clipboard function. The clipboard acts as a temporary system folder used to hold potential candidates on an interim basis prior to being placed in the Candidate Folder. When the results of a regular screening search, or a quick search as described above, are displayed, the software can display each location with a clipboard icon next to it. By selecting the clipboard icon, the location is transferred to the clipboard folder. During this procedure, the software can display to the user not only the list of search results, but also the contents of the clipboard folder. Once the user has transferred all of the desired locations to the clipboard folder, the contents of the clipboard folder can then be transferred to a created Candidate Folder.

In addition to the screening and quick selection procedures described above, the software permits the user to create a new and improved, or hypothetical location, from an existing location within the Candidate Folder by modifying that location's data. Further, the user can create a new location from an existing one within the Candidate Folder by overlaying the attributes of a city or town within that location on top of that location's location-wide attributes. This procedure can be used if, for instance, the user is interested in a site within a certain town's boundaries and/or sites both within that town and outside that town but all within the same location. In this example, the user would then be able to compare the aggregate taxes and other costs of doing business at a site within the town limits to those at a site outside the town limits but within the same county.

The user can create multiple Candidate Folders for each Project. The software displays the name of each folder established for a Project along with the total number of candidate locations in that folder. Also, the software indicates whether each of the candidate locations have a "complete" data record or "incomplete" data record. If a candidate record contains all the necessary rate data on which to perform financial modeling, then the software characterizes it as a "complete" record. Conversely, if the candidate location's record does not contain all the necessary rate data on which to perform financial modeling, then it is characterized by the software as a "incomplete" record. As can be seen, a candidate location record can be incomplete with respect to some nonessential data but still characterized as complete. Completed candidate records are preferable over incomplete candidate records for performing financial modeling. If financial modeling is performed using incomplete candidate records, the likely result will be incomplete or otherwise inaccurate financial calculations.

Figure 2:
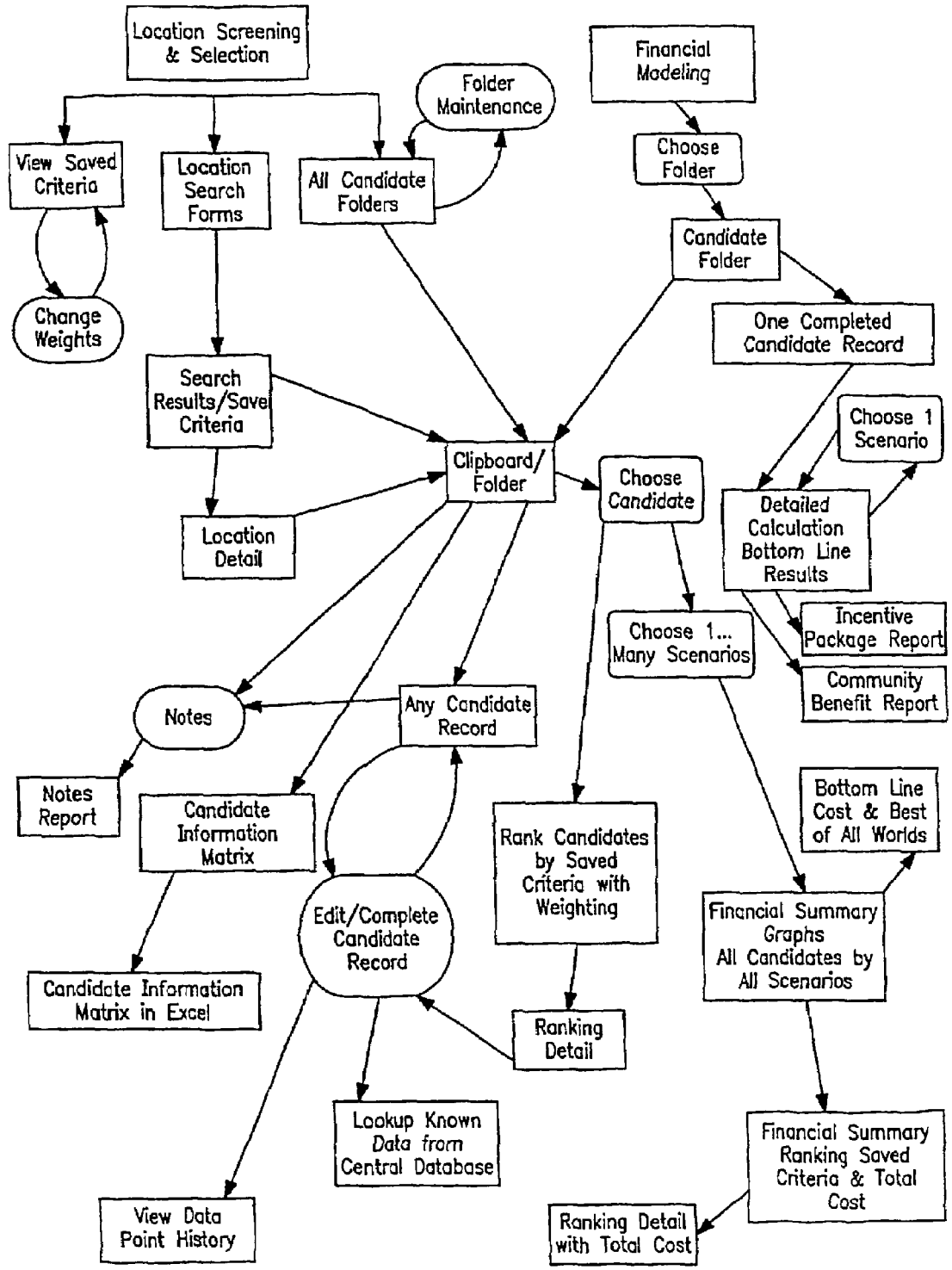
FIG. 2 illustrates a general flow chart of the system functions for Location Screening and Selecting, ranking of Candidate Locations, and performing Financial Calculations.

To complete a record, the system shows the user for each incomplete candidate location record what data is necessary to convert the record into a complete candidate record. The user can then modify the details of the incomplete record by inputting the missing data. The creation and manipulation of Candidate Folders, including the editing and completing of candidate records, are illustrated in the flowchart of FIG. 2.

The detailed demographic and/or economic data associated with a given location can be displayed by the software by, for example, clicking the location's name. Any categories of missing "required data" will also be displayed. In addition, the software can provide the user with the ability to input "notes" directed to a given location, e.g., by clicking on a "notes" icon. Detailed information about the taxes, incentives and financing could also be displayed by, e.g., clicking on an "information" icon. Once a location is entered into a Candidate Folder, the user can update, supplement, or otherwise change the data shown for that location as found in the system's database without changing the data in the system's database.

By selecting a Candidate Folder, e.g., by clicking the name of any Candidate Folder or the clipboard folder, the software can display the names of all locations in that folder along with the saved search criteria, if any, associated with that folder. If no search criteria is saved for the folder (e.g., the folder consists of only locations manually selected by the user, that is candidates that were not obtained by screening the database with selected search criteria), the system software permits the user to associate criteria with the folder. This will permit the user to perform ranking of the candidate locations, as discussed below. Alternatively, the software will also permit the user to modify the search criteria and then associate the modified criteria with a Candidate Folder for use in ranking the candidates.

Once the user has created a Candidate Folder, the software permits the user to create a Candidate Matrix. The software prompts the user to select two or more candidate locations from the Candidate Folder. The software then prompts the user to request creation of a matrix whereby the software presents each of the selected locations and their associated demographic and/or economic data in a side-by-side format for easy comparison.

The candidates can be ranked based on how well they met the saved criteria associated with the Candidate Folder. See the flowchart of FIG. 2. Candidates to be ranked are selected and then the user initiates the "Rank, By Saved Criteria" function Of the software. In this procedure, the software displays the total points for a location and its ranking based on the saved search criteria. By initiating a "Show Detail" function of the software, the user is presented with a display of the details of the ranking process. For example, for each criterion every candidate can be ranked with the best candidate (e.g. the candidate that comes closest to or exceeds the specified value of that criterion) getting a maximum score or point level (e.g., the maximum points per criterion is the total number of candidates in the ranking). If a candidate does not meet the criterion search level it could be given zero posts. Zero points could also be given if the data are missing.

The system can, under a default setting, assess each criterion equally. Alternatively, the software provides the user with the ability to assign weights to the criteria, based on their degree of importance relative to each other. Then, the process can calculate the scores mentioned above with regard to the different weights assigned by the user to these criteria, to provide weighted scores. Further, the user may decide to reassess these weights and thus have the process recalculate the scores using different relative weights of importance.

The software adds the scores for each candidate and for each criterion, whether differentially or evenly weighted, and arrives at a score for all selected candidates based on all criteria taken as a whole. The software also then can display the list of candidates in ranked order accordingly to their scores, for example, from highest score to lowest score.

In addition to the ranking procedure, once a candidate folder is created, the user may also use the software to perform Financial Modeling on individual locations within the candidate folder. See the flowchart of FIG. 2. Financial Modeling combines the specific company data with the candidate location data in a process to establish a "cost of doing business" for that location. The model does not establish all costs associated with a business, but computes costs that are likely to change based on the location. Alternatively, the user can include all the location-independent costs in the "Other Costs" category in the Business Scenarios. This category can be used to tale into account location-dependent costs that are not otherwise listed in the Business Scenario template.

The formulas used for performing the financial calculations are well known within the art. The software provides an easy and convenient method to perform such calculations quickly on one or more candidate locations and/or under one or more business scenarios. Further, the software preferably utilizes formulas that will take into account calculations particular to a specific location. For example, a location may have a particular format for determining property tax assessments. The software will determine the property tax assessment in accordance with the location's particular method of assessment. The calculation will provide the users with a value for the resultant tax and thus permit the user to make an "apples-to-apples" comparison among the assessments as computed by various locations. In addition, the software preferably provides the user with the ability to select which formula to use for certain calculations that have various acceptable methods of determination. For example, the software can permit the user to select whether to use a straight-line depreciation formula or a double-declining depreciation formula.

Thus, in the Financial Modeling stage of the process, the user first selects a candidate folder. Upon selecting a candidate folder, the software displays to the user the list of candidate locations within the folder and then provides the user with the opportunity to generate a variety of reports. In order to proceed with Financial Modeling, the software preferably requires that at least one candidate have "complete" data. Candidate Folders, which contain candidates with complete records, will be shown when Financial Modeling is initiated.

By selecting a Candidate Folder having at least one candidate with complete data, the Financial Modeling procedure provides a list of the complete candidates and prompts the user to request Detailed Calculations on any of the complete candidates individually under any of the business scenarios. The Detailed Calculations combine a single business scenario with a single location's economic factors. The location and the business scenario can be changed to run another Detailed Calculation.

The display of a Detailed Calculations can reproduce the details on the selected business scenario and then show the costs for each year of the selected business scenario. For example, the displayed costs can be the individual costs and the overall costs of doing business associated with that location under the selected scenario (e.g., the costs of capital investment, income taxes, revenue taxes, labor, property taxes, utilities, sales taxes, insurance, transportation, training, other miscellaneous costs, and the stun thereof). Also, these costs can be presented on the basis of before and after any applicable incentives, i.e., Pre-Incentive costs and Post-Incentive Costs, respectively. The Pre-Incentive costs represent the capital and operating costs associated with that location and that scenario before taking into account any applicable statutory or negotiated incentives. The Post-Incentive costs represent those same costs after applying any applicable statutory or negotiated incentives. The total Pre-Incentive and Post-Incentive costs for all years of the business scenario can also be presented in terms of actual total costs and/or net present value (NPV) of total costs. In addition, the Detailed Calculations can show the resultant incomes for each year of the selected business scenario after applying the overall pre-incentive costs and post-incentive costs, as well as the total incomes, based on pre-incentive costs and post-incentive costs, for the entire time span of the business scenario.

From the Detailed Calculation display, the software can prompt the user to request the generation of a Direct Community Benefit Report, an Indirect Community Benefit Report, and/or an Incentive Package Report. The Direct Community Benefit Report can display, for the selected location and for each year of the selected business scenario, the income tax, the revenue tax, property tax, sales tax, and the total thereof (i.e., total direct benefits). Typically, these values are calculated after all incentives are applied. Also, this report can display the total for each of these components for the entire time span of the selected scenario (e.g., the total property taxes for the years 2002-2010 under a most likely business scenario). From the display of the Direct Community Report, the software can prompt the user to create an Indirect Community Benefit Report. In this case, the user inputs a community multiplier, for example, 7.0, and the software then uses this value to generate an Indirect Community Benefit Report which can display, for the selected location and for each year of the selected business scenario, the total wages and the multiplier benefit effect. The community multiplier is an economic impact concept that estimates the impact of a business operation on a community's economy by multiplying the operation's payroll by a factor—that an economist may determine or that may be determined from certain benchmarks for certain kinds of companies or industries in certain kinds of communities. This factor, or "the multiplier," is intended to mirror or model the amount of times that a payroll dollar gets spent in the community, e.g., at local stores, before it finally "comes to rest" in a savings account, investment account, or other capital investment.

The Incentive Package Report can display to the user, for the selected location and for each year of the selected business scenario, the credits, reductions, abatements, or other assistance, offered by the location selected with regards to income tax, property tax, sales tax, training costs, labor costs, utility costs and miscellaneous other costs for each of the years in a selected business scenario. Also, this report can display the total for each of these components for the entire time span of the selected scenario (e.g., the total utility costs for the years 2002-2010 under a most likely business scenario) in terms of actual costs and the net present value thereof.

In Financial Modeling, in addition to the Detailed Calculations and associated reports described above, the software can prompt the user to create a Candidate Information Matrix and/or to calculate a Financial Summary. For these reports, the user is first prompted to select which candidate locations (or all candidate locations) within a given candidate folder to be used in generating the reports.

For example, the user can select all of the candidate locations or individual candidate locations and create a Candidate Information Matrix. As mentioned above, this matrix provides a side by side display of some or all the possible search criteria data, i.e., some or all of the demographic and/or economic data contained in the database for each of these selected locations within the Candidate Folder. The software can also prompt the user to generate this Candidate Information Matrix prior to entering the Financial Modeling procedure, i.e., when the software displays to the user the locations within a selected candidate folder.

For the Financial Summary, as mentioned, the software first prompts the user to select the candidate locations to be considered in the report. Next, the software prompts the user to select one or more of the business scenarios created for the project. For example, the user can choose that all candidate locations within a folder be considered in the Financial Summary and then select that a most likely business scenario and a pessimistic business scenario be used in generating the report.

The software then generates a Financial Summary Report which displays a ranking of the selected candidate location sites based on post-incentive costs for the selected business scenario. For each candidate, the system can display post-incentive costs (ordered lowest to highest), the percent difference among the individual locations based on post-incentive costs, the pre-incentive costs, and the percent difference among the individual Locations based on pre-incentive cost. The Financial Summary report can display these bottom line results numerically and graphically. For example, a bar chart will show the NPV of the costs both before and after incentives.

In addition, from the Financial Summary Report the user has the opportunity to request more details concerning the post-incentive costs and the pre-incentive costs for the selected candidates. This can be helpful to establish the reason for the cost differential. This investigation can lead to negotiation, discussion-points, and further cost analysis among the parties involved in the project.

If the user requests such details, the software displays to the user a breakdown of the components of, for example, the post-incentive costs for each of the candidate locations. For example, post-incentive costs can include the sum of the capital investment, labor costs, income tax, revenue tax, property tax, utility costs, sales tax, insurance costs, transportation costs, training costs, and other costs, after applying any incentive available in or offered by the particular location, and the pre-incentive costs can include the sum of these same factors without applying any such incentive.

In these detailed Financial Summary reports, the software can highlight and then aggregate the best, or lowest, cost attributes among the candidate locations in the summary to show the "Best of All Worlds," the hypothetical location that would contain in one place the best cost elements that the candidate locations collectively possess. This feature can be used for benchmarking and negotiating decision choices.

Using the information provided by the system, e.g., the reports generated by the Financial Modeling, the user is able to make an educated and well-informed decision concerning available capital investment choices for business operations and facilities. The user can then further investigate one or more of the candidates for the availability of suitable specific land or land and building sites.

The software also can collect, store, or, via website links, provide access to site-specific data. Typically, however, the main differences in costs of doing business are at the location (e.g., county) level, i.e., in the location's attributes, not in the attributes among various sites within that location (e.g., county). Nevertheless, the user certainly can enter and use site-specific data as desired. The user can determine the desired sites via accessing property databases, contacting EDAs, using real estate brokers, conducting site visits, or a combination of these. Once the user has done so, the user can input into the software both site-specific data and also a location's attributes that in fact may vary site-by-site (such as infrastructure costs, enterprise zone boundaries, and the like) for more detailed comparative analysis.

EXAMPLES

Example 1

Figure 3B:
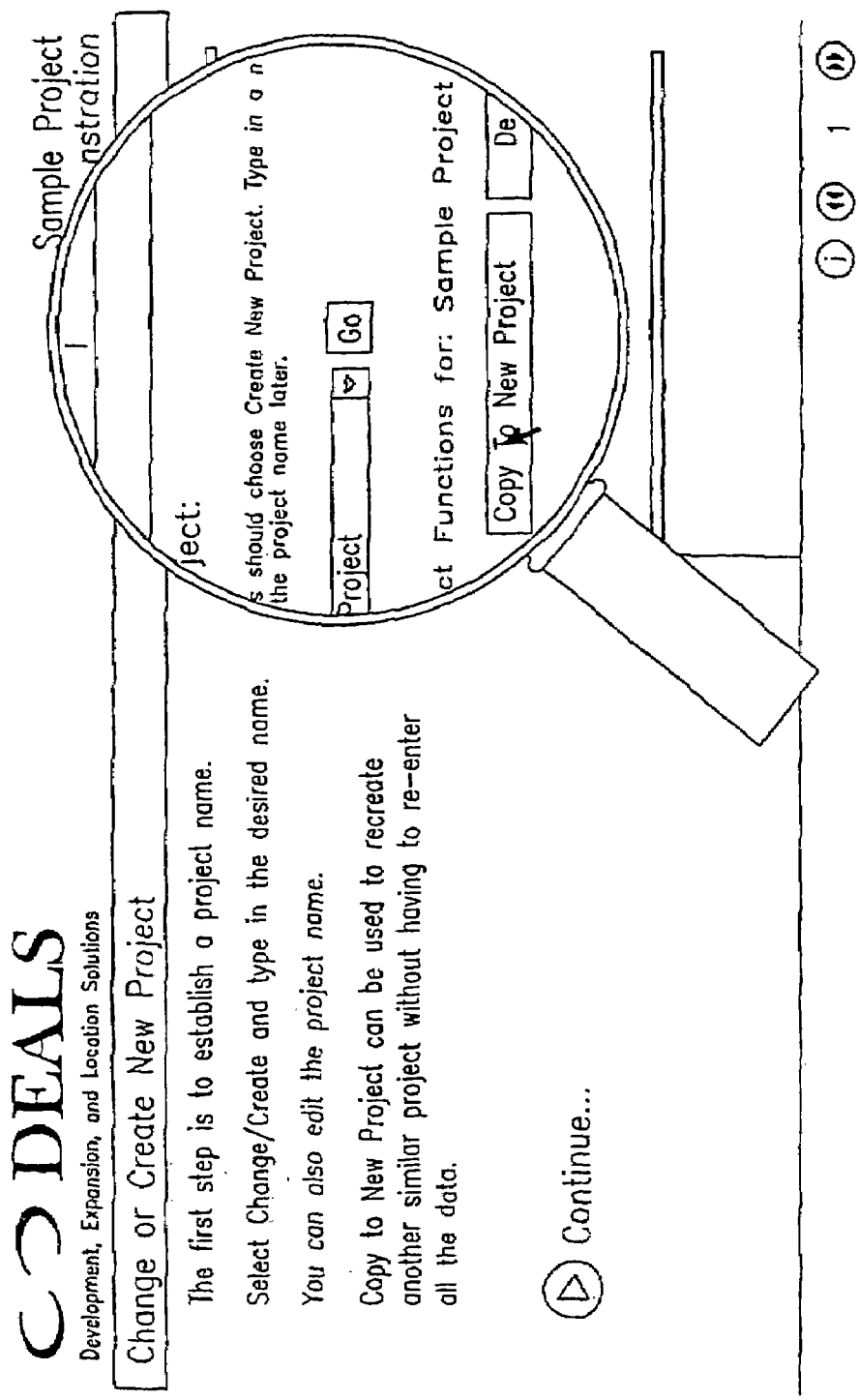
FIGS. 3a-3o illustrate a demonstration of a software embodiment in accordance with the invention.
Figure 3C:
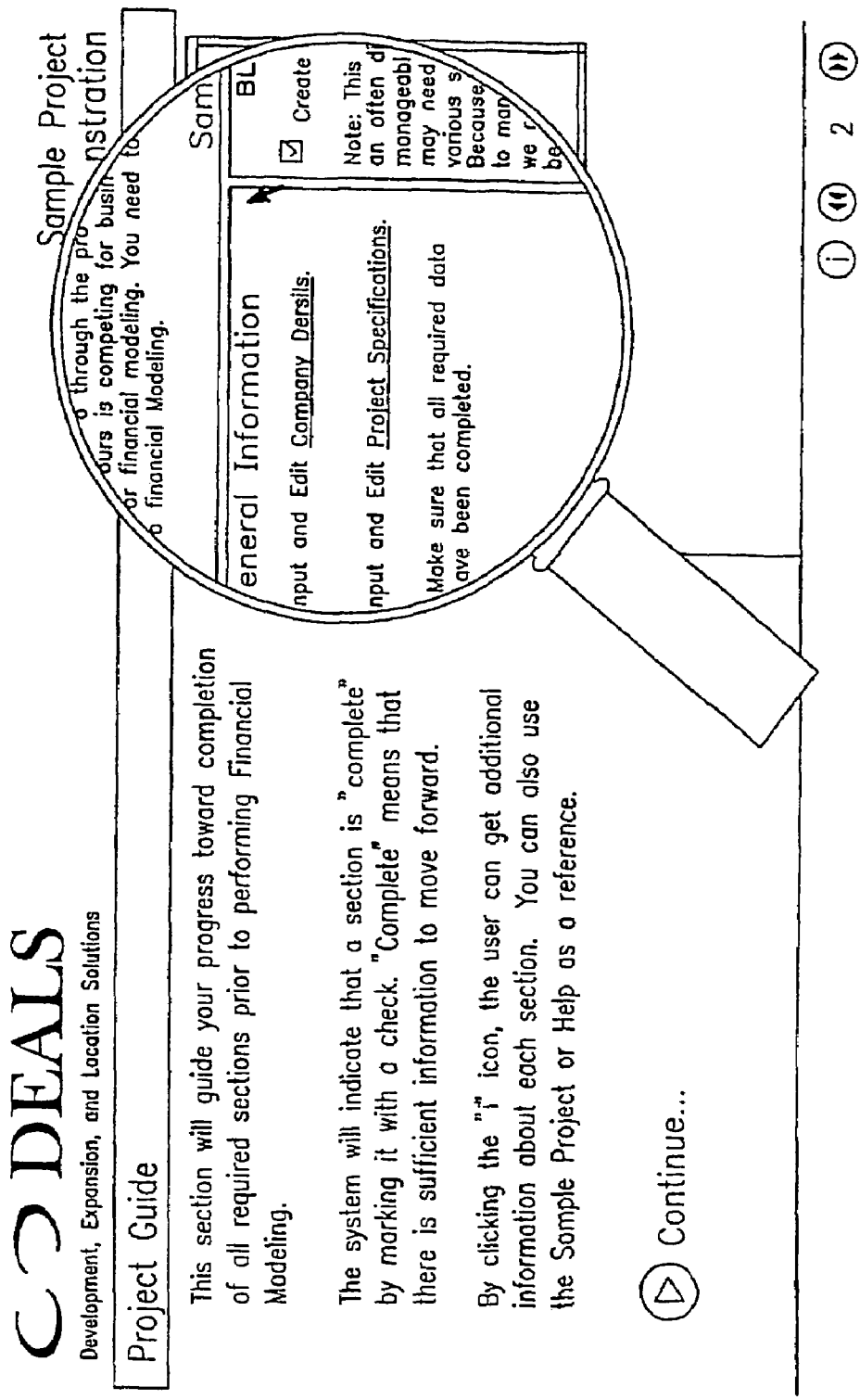
Figure 3D:
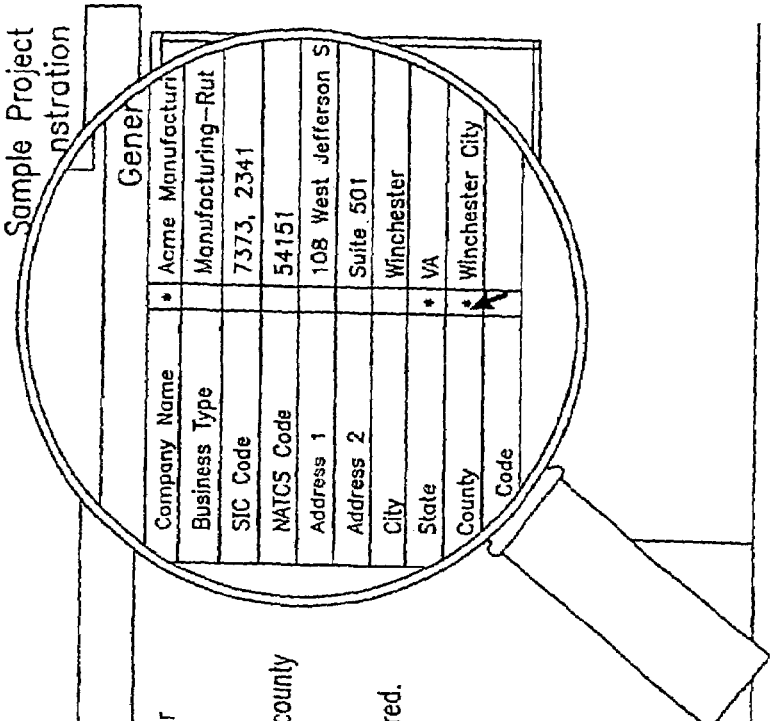
Figures 1, 3E:
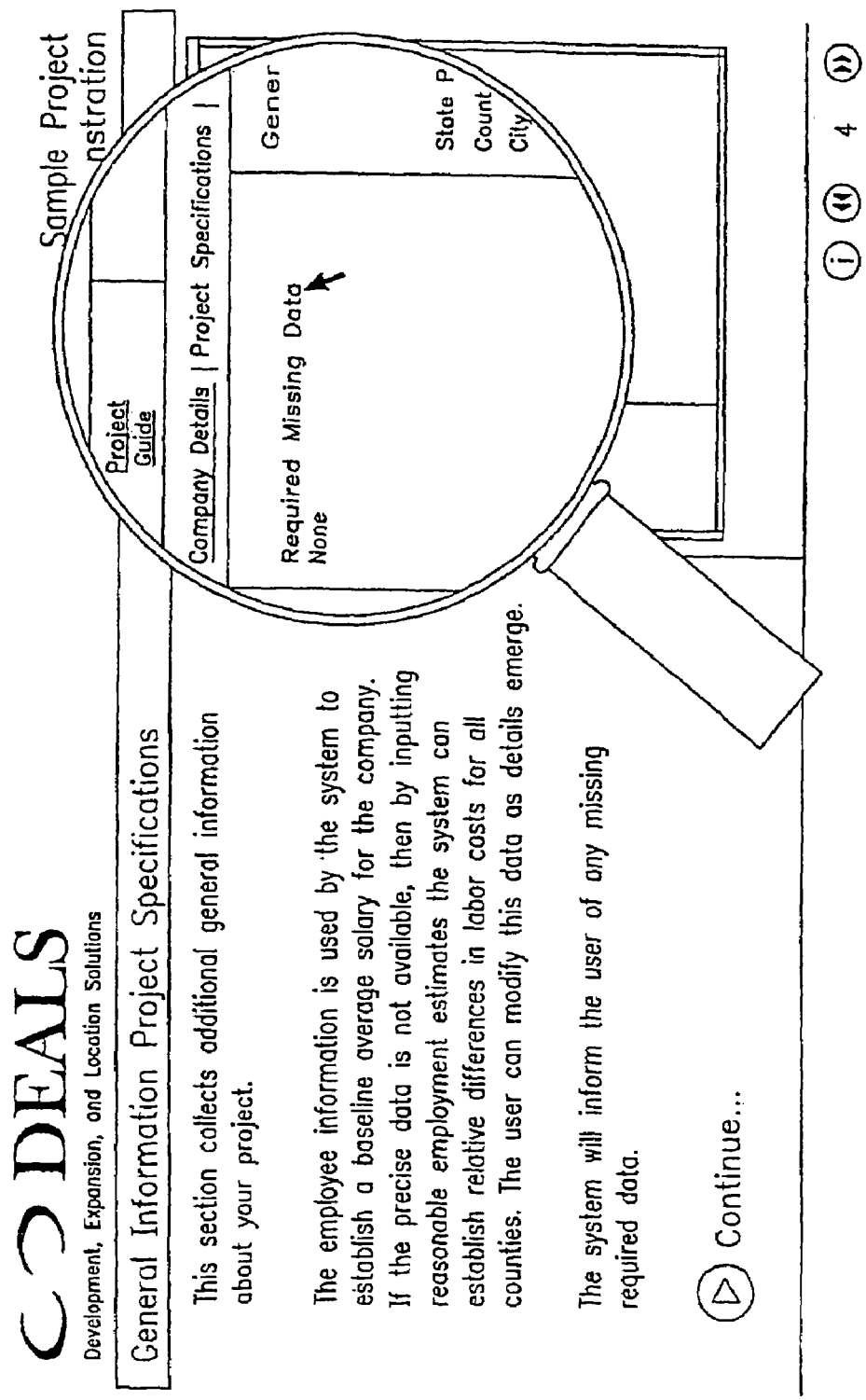
Figures 2, 3E:
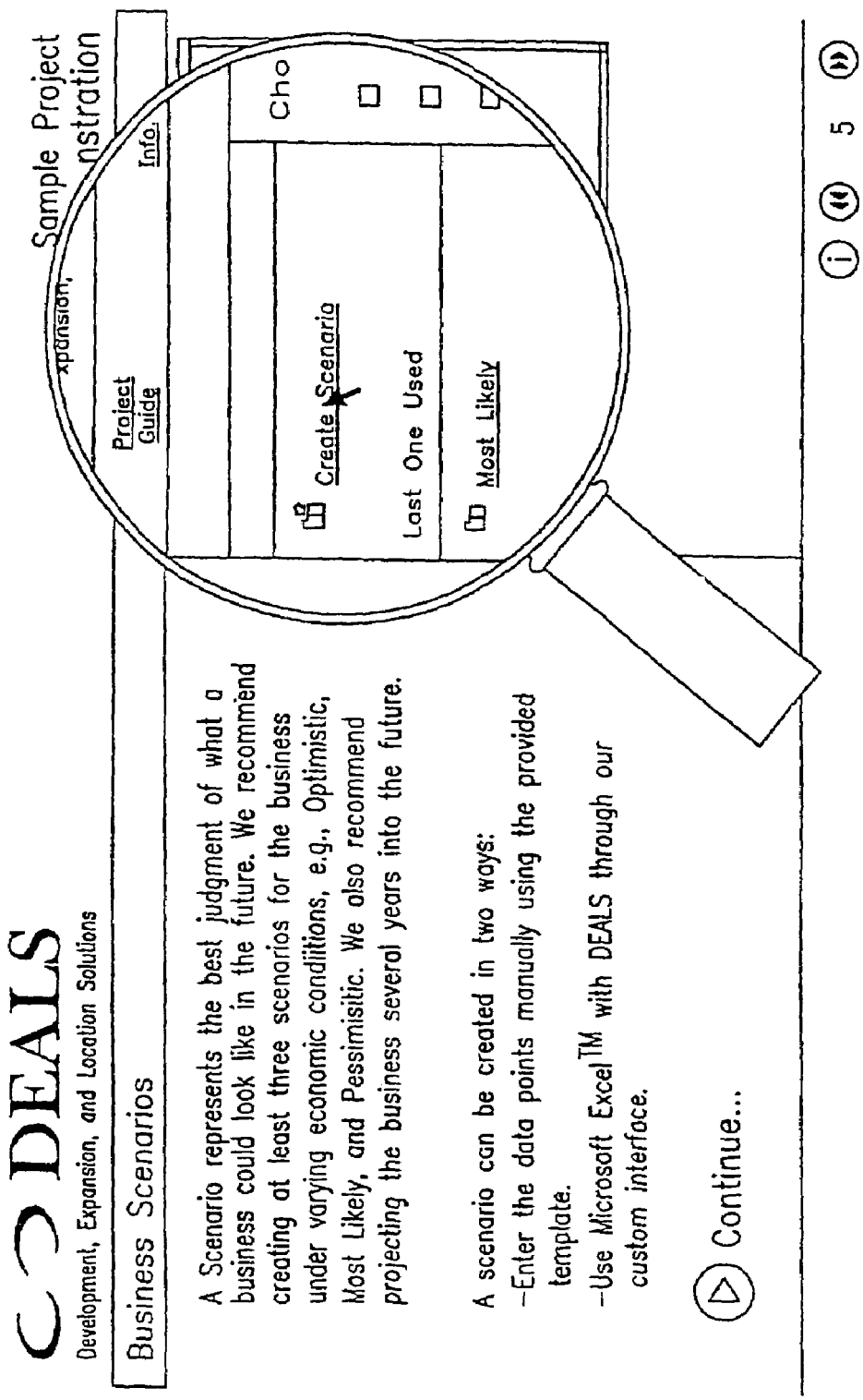
Figure 3F:
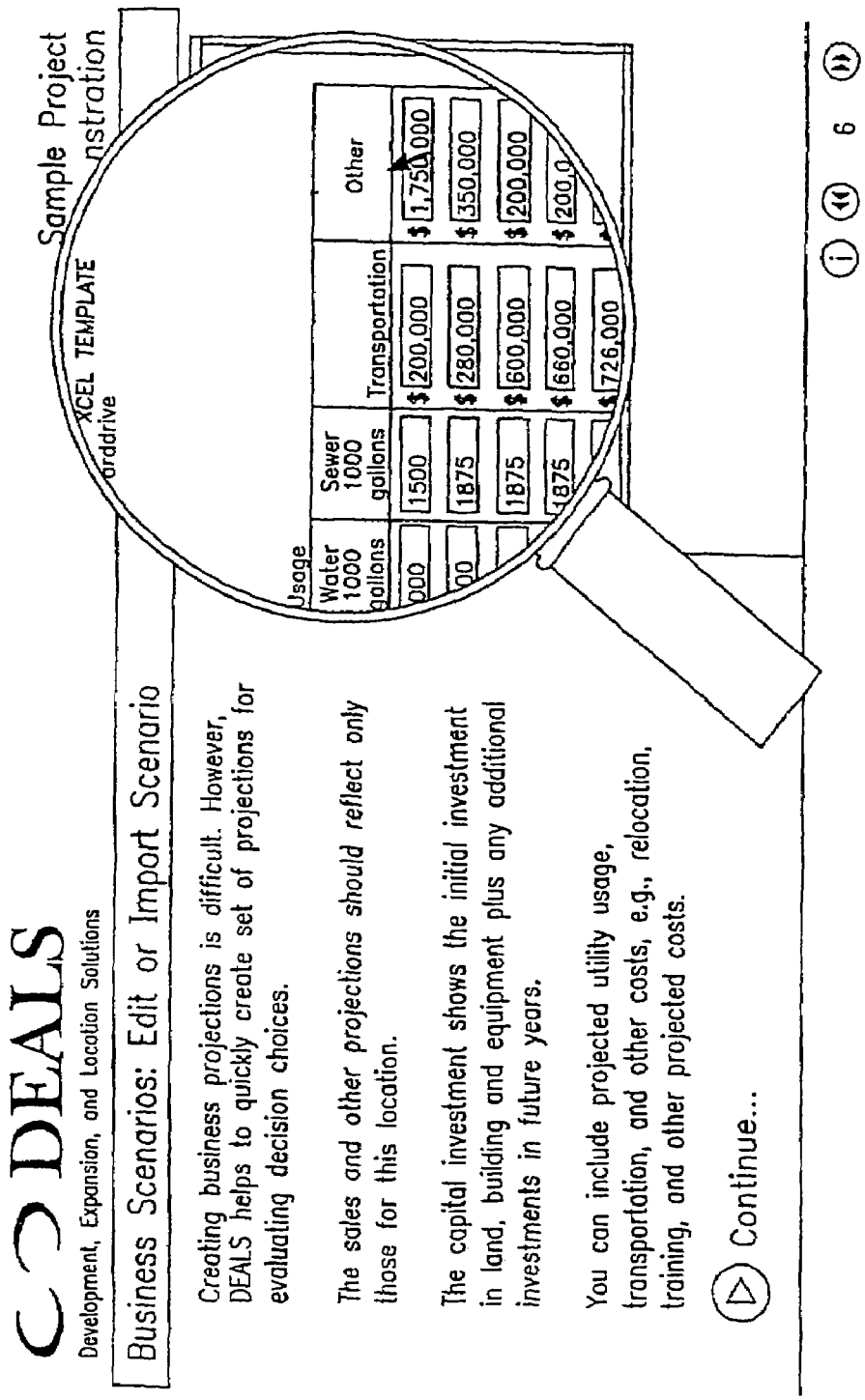
Figure 3G:
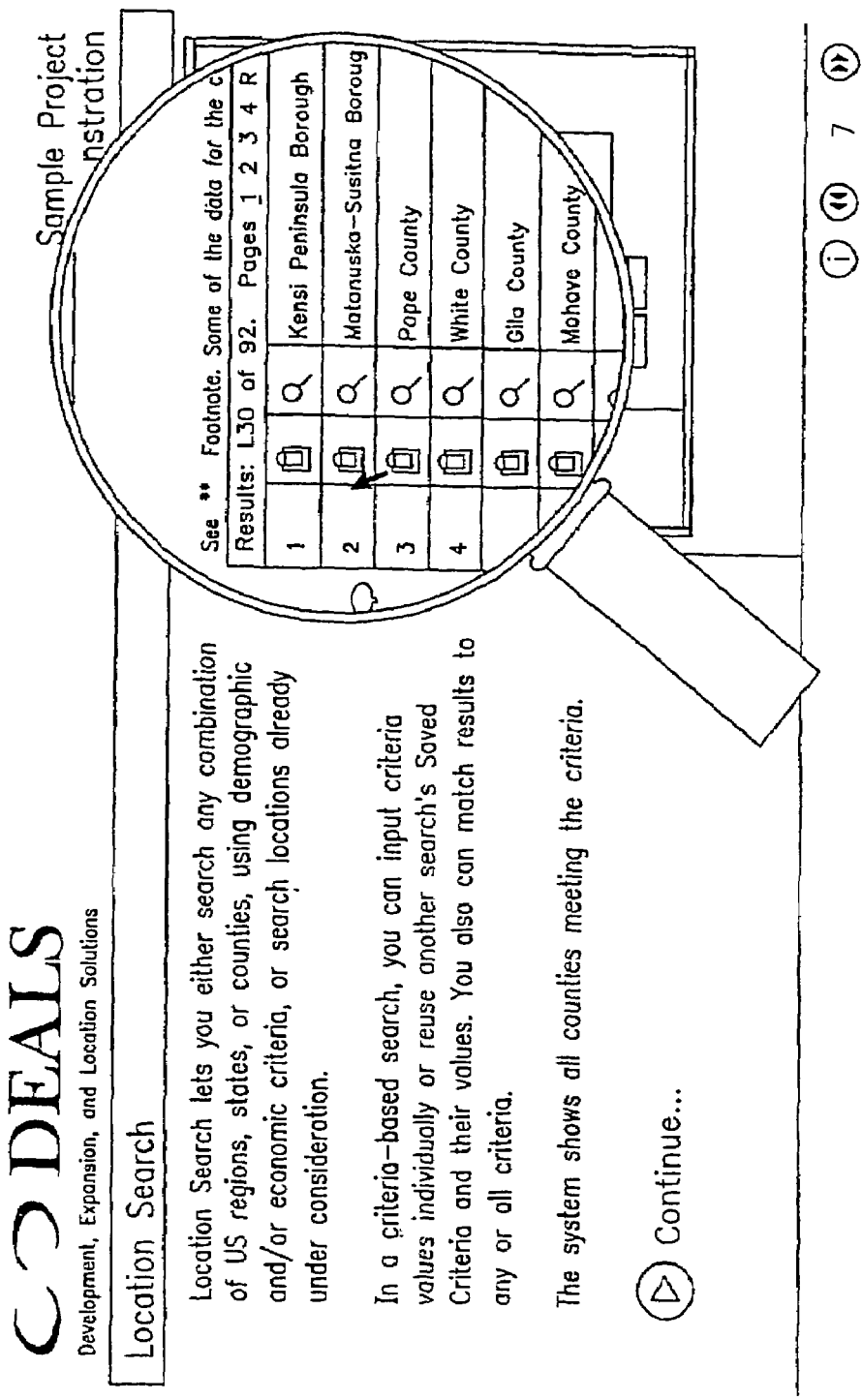
Figure 3H:
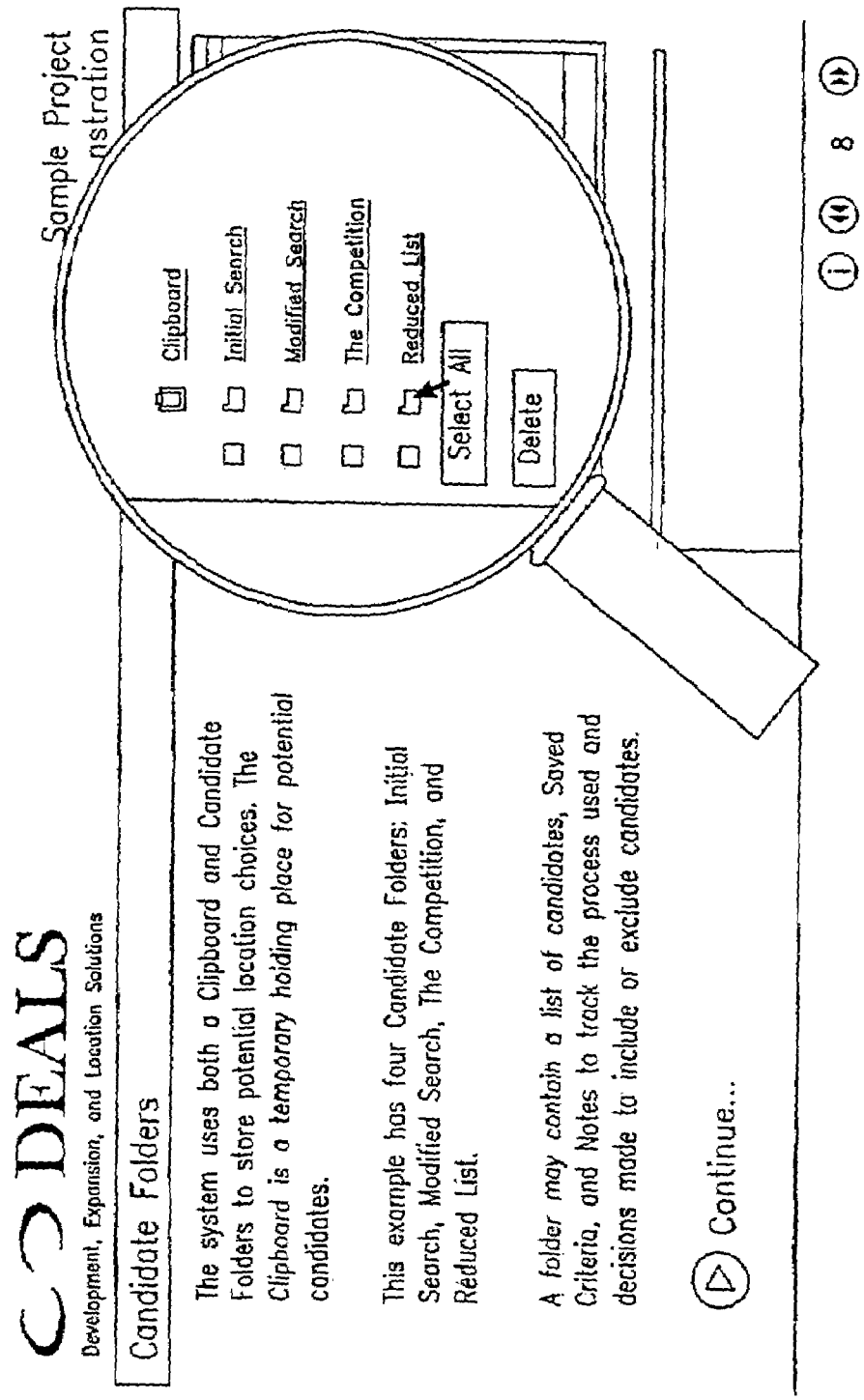
Figure 3I:
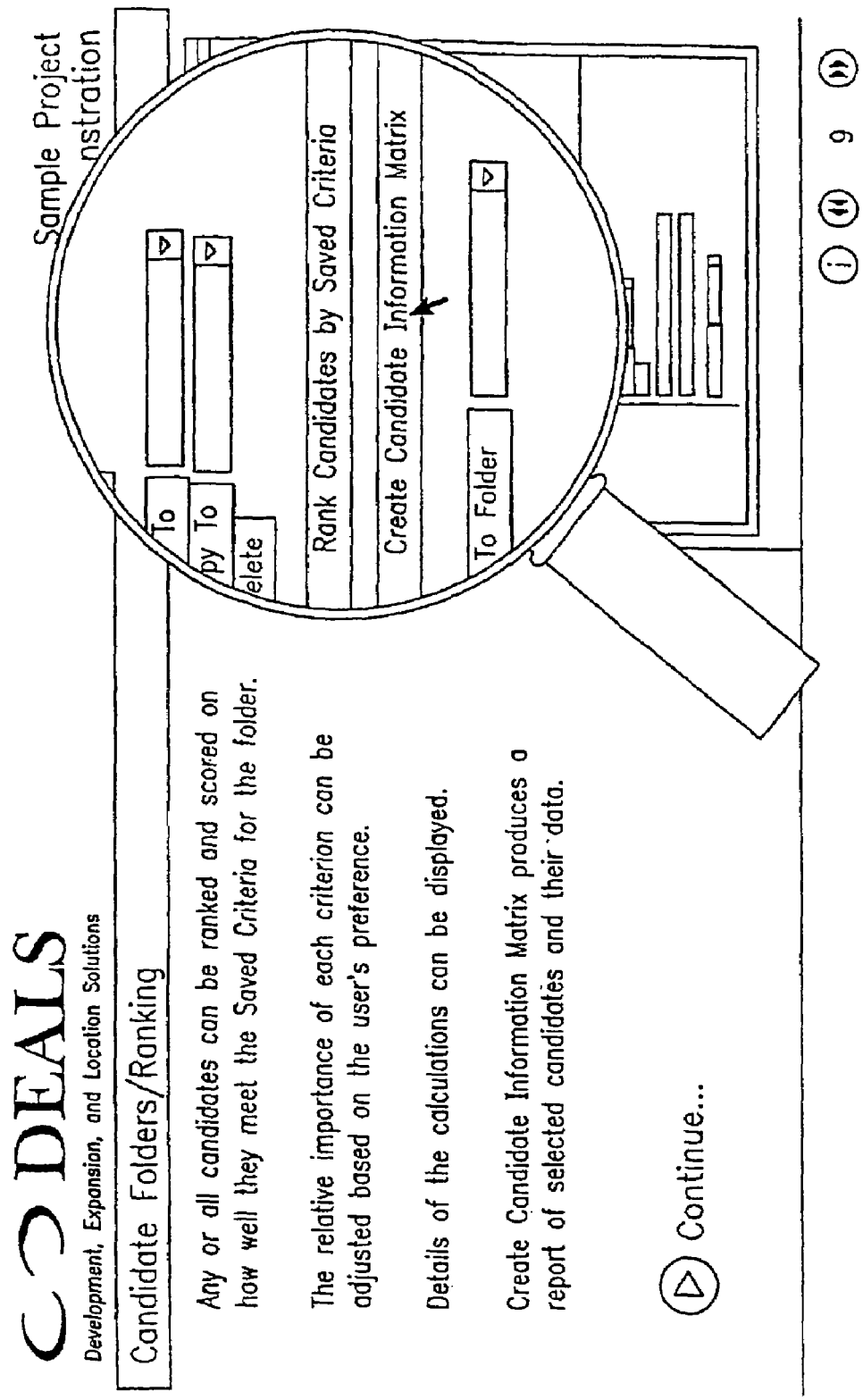
Figure 3J:
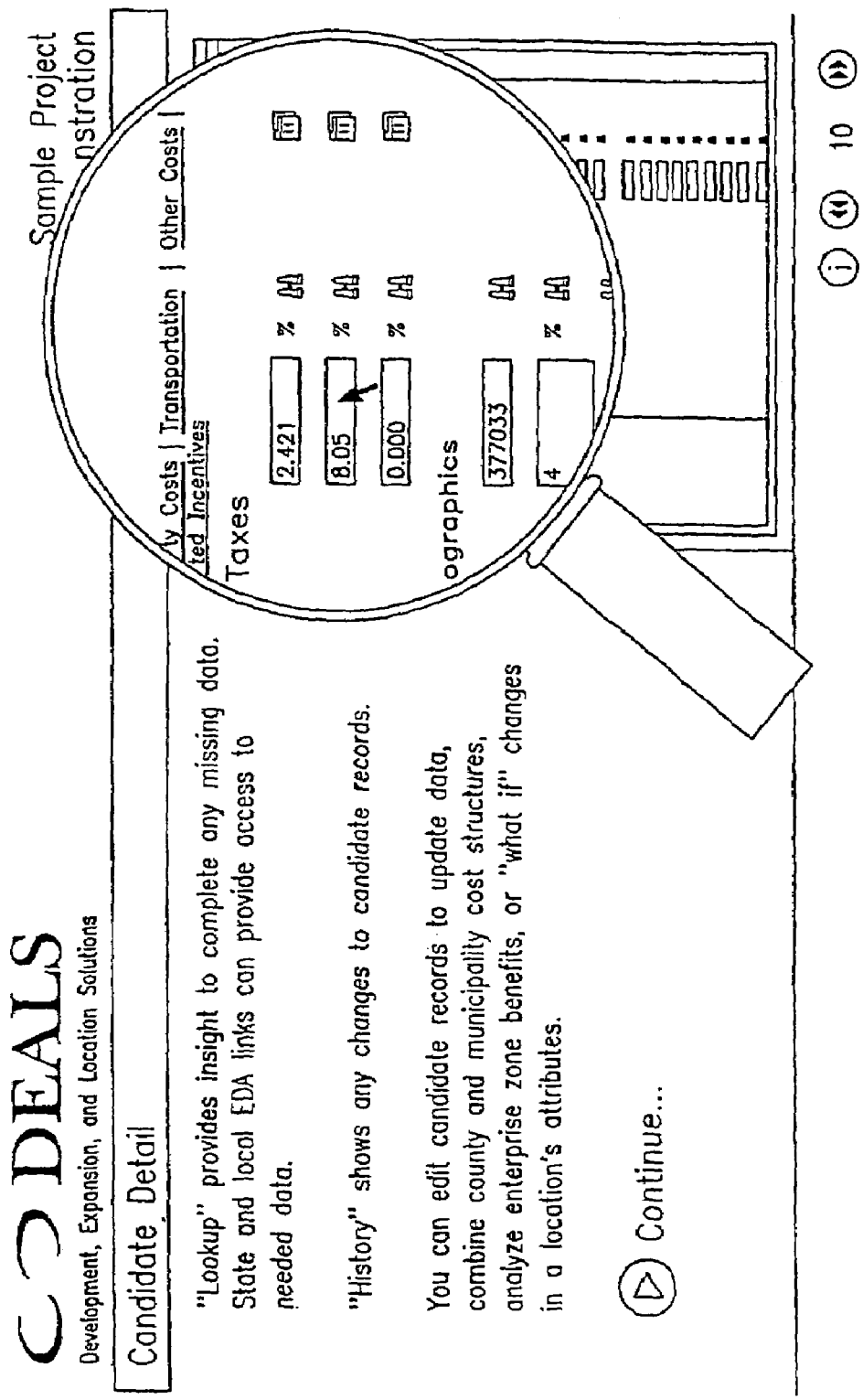
Figure 3K:
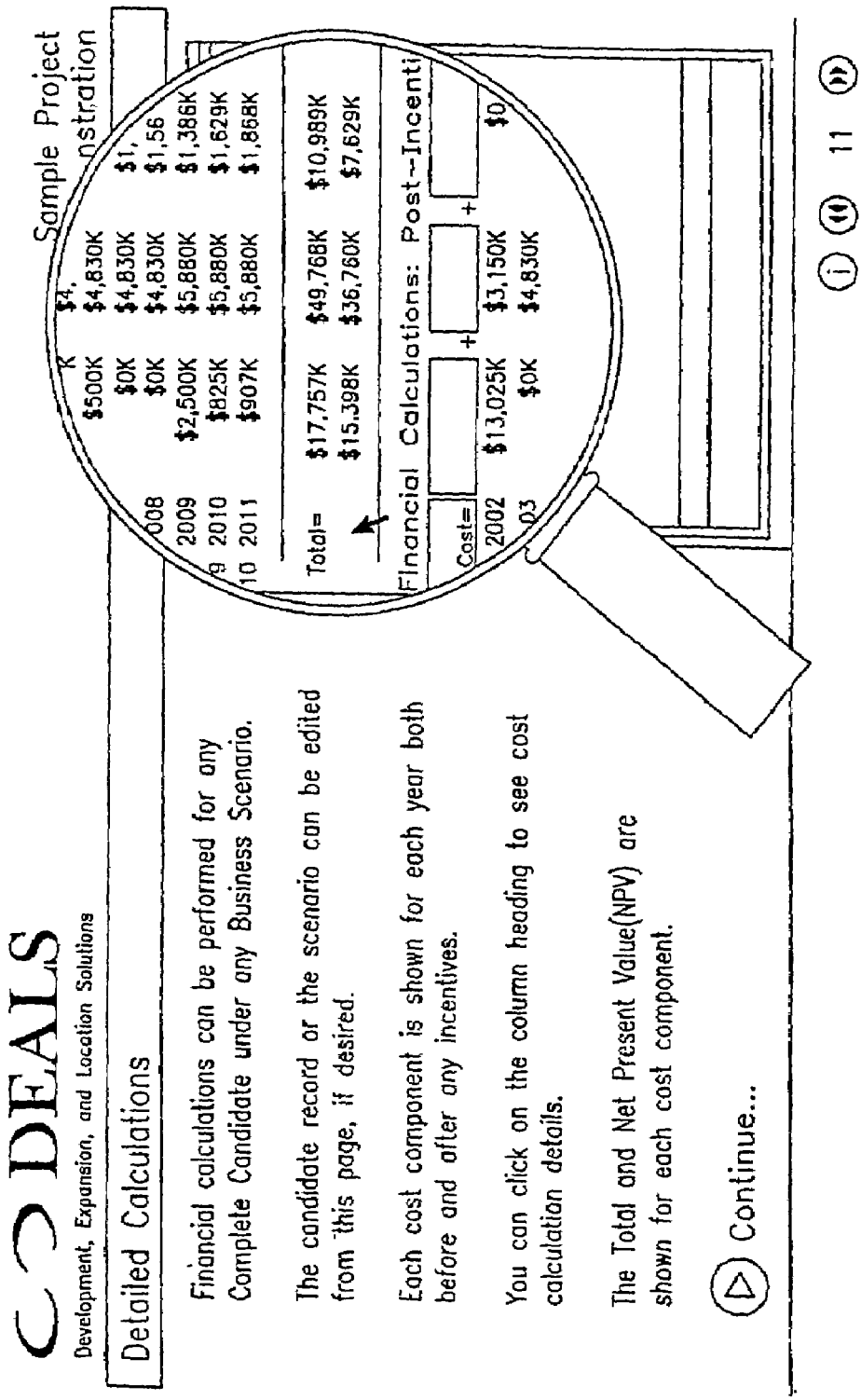
Figure 31:
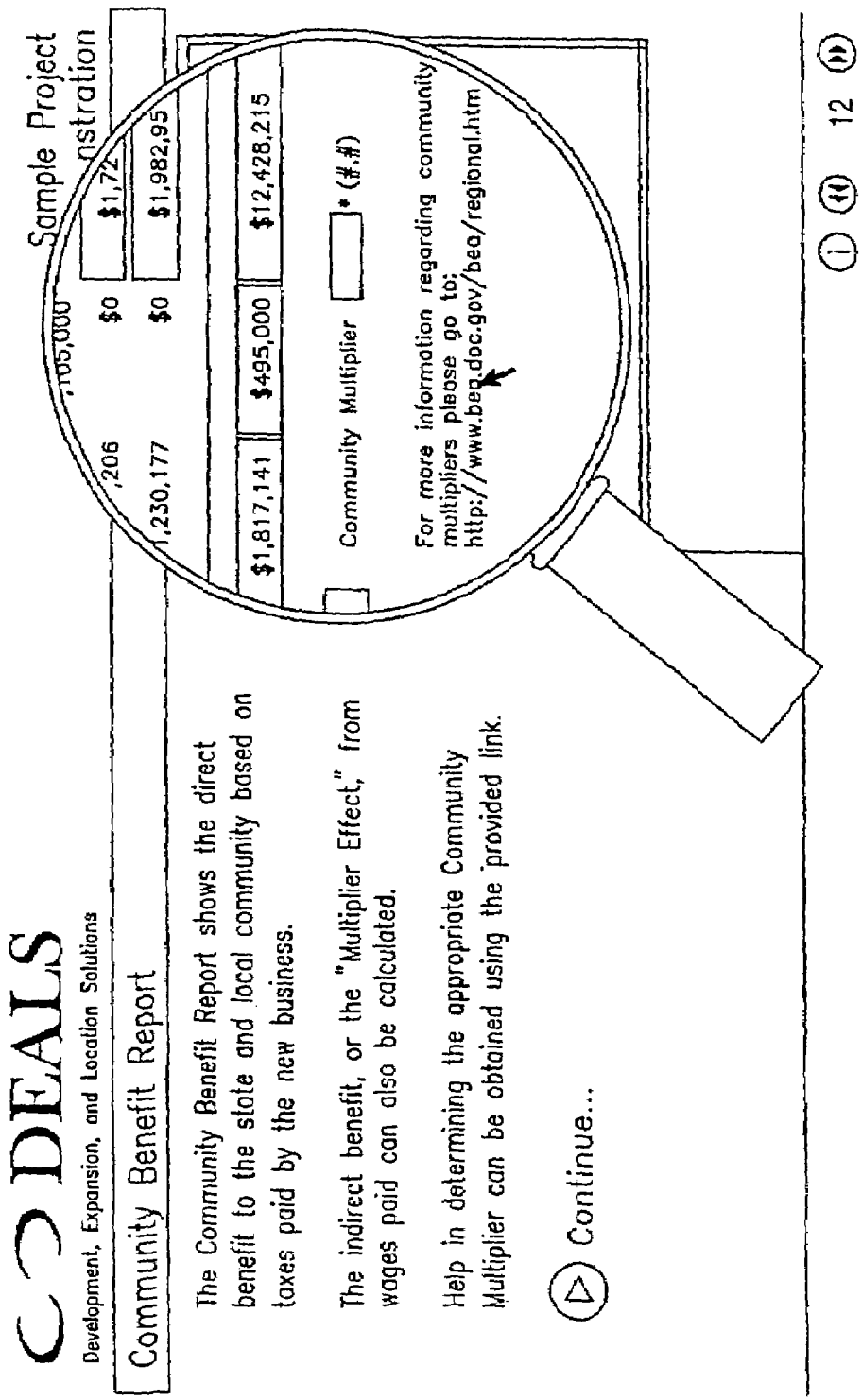
Figure 3M:
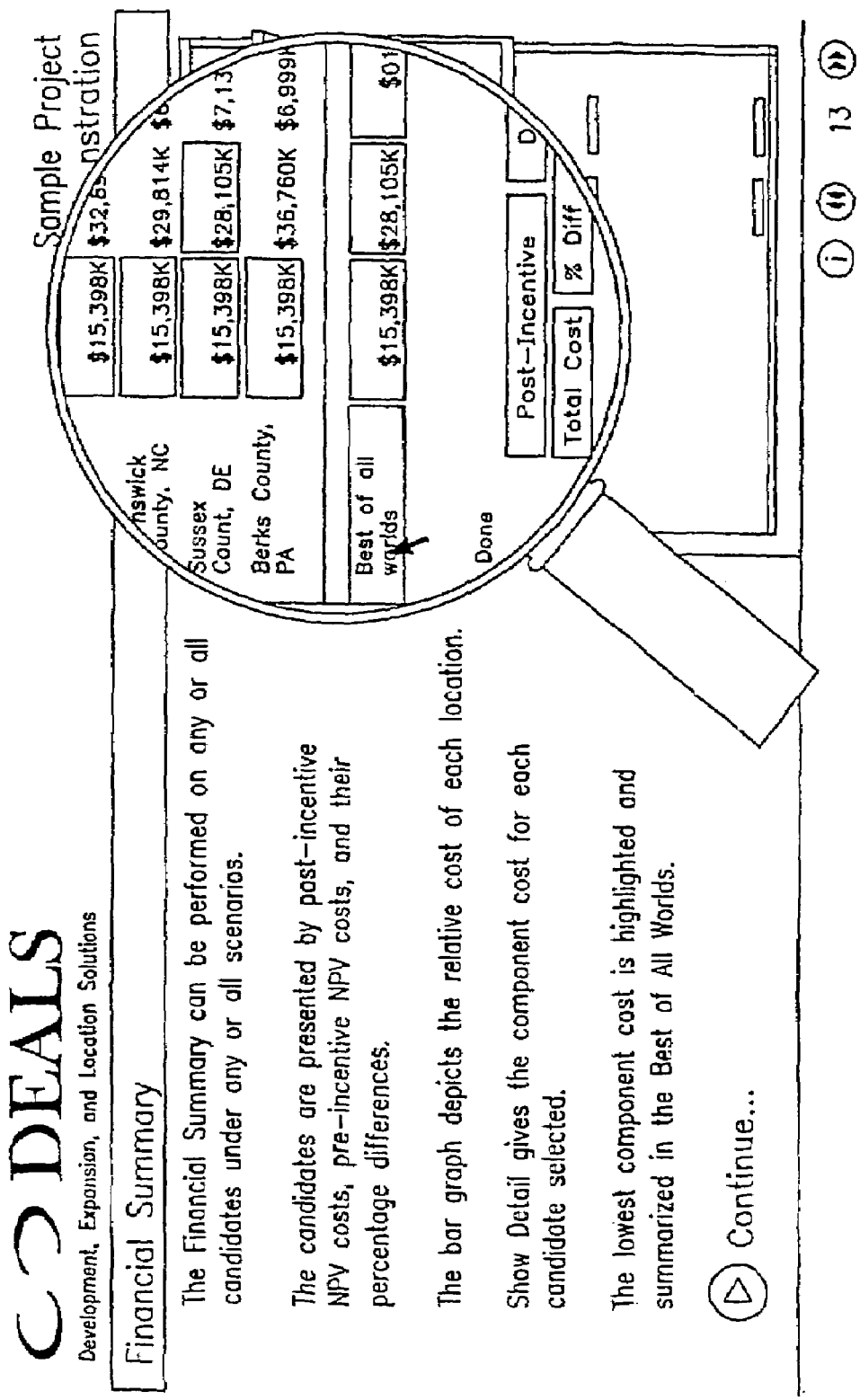
Figure 3O:
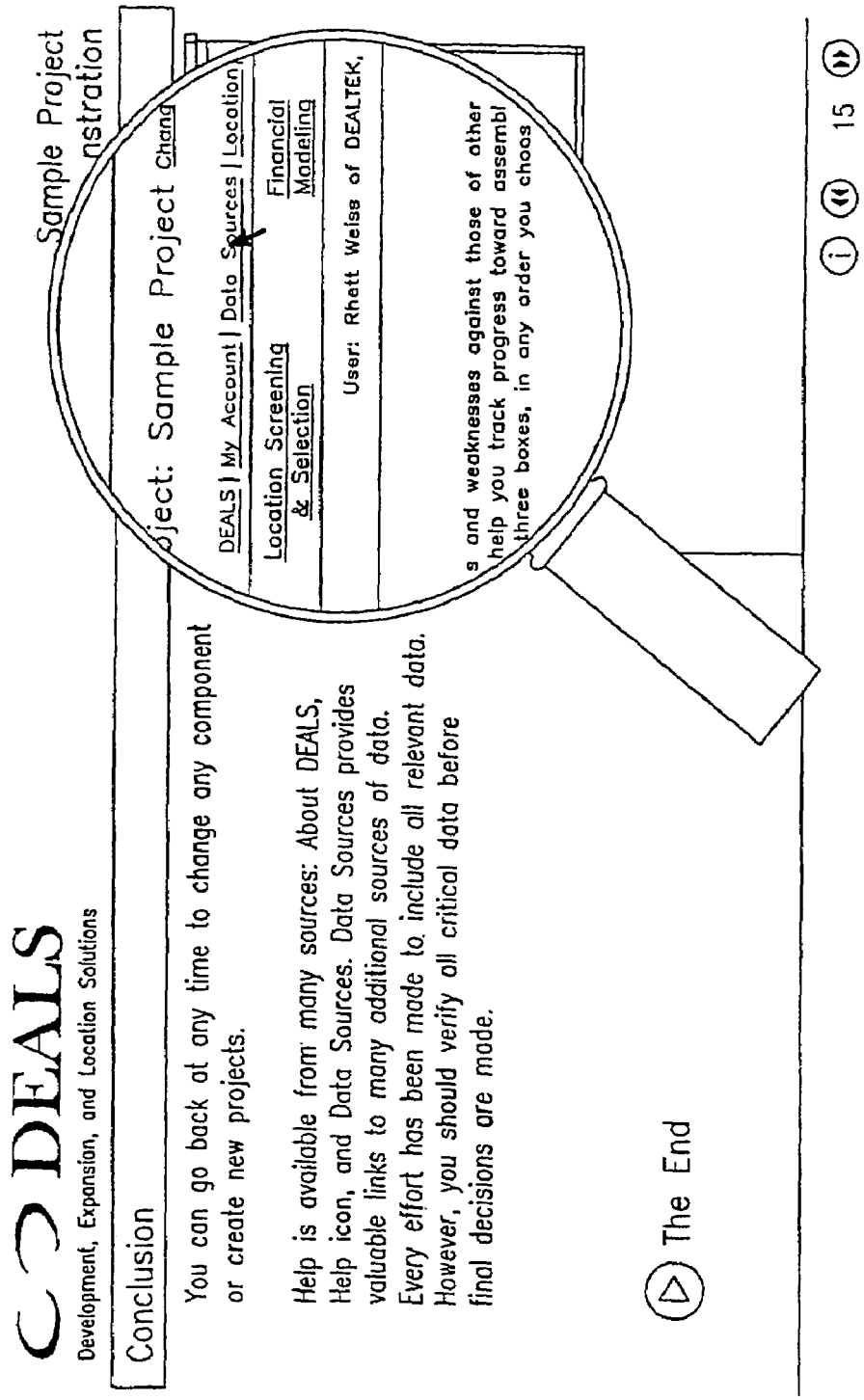

As mentioned above, FIGS. 3a-3o illustrate a demonstration of a software embodiment in accordance with the invention. This series of Figures provides s general guide through several processes of the invention, for example: initiating a project; inputting company information; inputting project specifications; creating business scenarios; screening a database for candidate locations; using a clipboard and creating Candidate Folders; ranking candidate locations;
  displaying details of candidate locations; performing financial calculations; creating and displaying Community Benefit reports; creating and displaying Financial Summary reports; and Creating and displaying a Best of All Worlds analysis.
  See also the software embodiment available at www.dealtek.com.

The preceding examples can be repeated with similar success by substituting the generically or specifically described operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosure of all applications, patents and publications, cited above and below, and of corresponding U.S. Provisional Application Ser. No. 60/359,338, filed Feb. 26, 2002, is hereby incorporated by reference.

The invention claimed is:

1. A method for providing a list of competitive locations and capital investment transactions for a business operation or business facility, said method comprising:
  (a) Selecting a geographic scope for the search for a potential location in which to make a capital investment in a business operation or facility;
  (b) Using a computer, which can access software that can perform a screening operation in which a database containing a listing of locations within said selected geographic scope and associated demographic data, economic data, or both demographic and economic data are searched based on selected search criteria, to input a data set containing one or more search criteria of demographic data, economic data, or both demographic and economic data for screening potential locations;
  (c) Using said software, via said computer, to screen said database containing a listing of possible locations within said selected geographic scope with said data set containing one or more search criteria regarding demographic data, economic data, or both demographic and economic data associated with each location to determine which locations satisfy the search criteria;
  (d) Displaying, via said computer, a list of candidate locations that satisfy the search criteria;
  (f) Using said software, via said computer, to save the list of candidate locations, edited or unedited, along with their associated demographic data, economic data, or both demographic and economic data, in a Candidate Folder;
  (g) Using said software, via said computer, to create a Ranking of Candidates for two or more of the candidate locations contained within the Candidate Folder dependent on how well each location satisfies each of the individual search criterion;

(h) Displaying, via said computer, the candidate locations in ranked order;

(l) Using said computer to input at least one set of project specifications, to input at least one set of business scenario data, or to input at least one set of project specifications and at least one set of business scenario data;

(m) Selecting one or more candidate locations within said candidate folder and one or more of said business scenarios for use in financial calculations;

(n) Using said software, via said computer, to perform one or more financial calculations on the selected business scenario(s) wherein said financial calculations are selected from: Direct Community Benefit Report; Indirect Community Benefit Report; Incentive Package Report; Best of all Worlds analysis; Detailed Financial Calculations; and Financial Summary calculations, and (o) Displaying, via said computer, Detailed Financial Calculations, which combine a selected business scenario with a selected candidate location's economic factors, and which includes displaying:

(1) individual costs and the overall costs of doing business associated with that location under the selected scenario, wherein the displayed costs are calculated on the basis of before and after any the application of any incentives associated with the candidate location, (2) the resultant net income or loss for each year of the selected business scenario after applying the overall pre-incentive costs and post-incentive costs, and the cumulative net income or loss, based on pre-incentive costs and post-incentive costs, for the entire time span of the business scenario, or (3) both (1) and (2).

2. A method according to claim 1, further comprising using said computer to calculate and display estimated costs of business start-up, costs of ongoing operations, or both business start-up, costs of ongoing operations for candidate locations within a Candidate Folder.

3. A method according to claim 1, further comprising using said computer to perform at least one of a ranking, weighing, or scoring of candidate locations within a Candidate Folder based on at least one of financial cost, weighted search criteria, and relative importance of criteria to financial costs, and display displaying the result(s).

4. A method according to claim 1, further comprising inputting into said computer changes in at least one of business scenarios, project specifications, and economic data, and calculating and displaying estimated costs of business start-up, costs of ongoing operations, or both business start-up and costs of ongoing operations for candidate locations within a Candidate Folder.

5. A method according to claim 1, further comprising using said software, via said computer, to perform a Best of All Worlds analysis wherein the best, or lowest, cost attributes among candidate locations are highlighted and aggregated in a summary to show a hypothetical location that would contain in one place the best cost elements that the candidate locations collectively possess, and using said computer to display the results of said Best of All Worlds analysis.

6. A method according to claim 1, further comprising using said software, via said computer, to generate a Direct Community Benefit Report that shows for a selected candidate location and for each year of a selected business scenario, the income tax, the revenue tax, property tax, sales tax, and the total thereof, before or after incentives associated with the candidate location are applied, and using said computer to display said Direct Community Benefit Report.

7. A method according to claim 1, further comprising using said software, via said computer, to generate an Indirect Community Benefit Report wherein the user inputs a community multiplier, and this value is used to generate an Indirect Community Benefit Report which displays, for a selected location and for each year of a selected business scenario, the total wages and the "multiplier effect" or beneficial economic impact of these wages on the location, and using said computer to display said Indirect Community Benefit Report.

8. A method according to claim 1, further comprising using said software, via said computer, to generate an Incentive Package Report that shows, for a selected location and for each of the years of a selected business scenario or all of the years of a selected business scenario, the credits, reductions, abatements, or other assistance offered by the location selected with regards to income tax, property tax, sales tax, training costs, labor costs, utility costs and miscellaneous other costs for each of the years of a selected business scenario or all of the years in a selected business scenario, in terms of actual costs, the net present value, or both actual costs and net present value thereof, and using said computer to display said Incentive Package Report.

9. A method according to claim 1, further comprising using said software, via said computer, to perform Detailed Financial Calculations which combine a selected business scenario with a selected candidate location's economic factors and which displays:

(1) individual costs and the overall costs of doing business associated with that location under the selected scenario, wherein the displayed costs are calculated on the basis of before and after application of any incentives associated with the candidate location, (2) the resultant net income or loss for each year of the selected business scenario after applying the overall pre-incentive costs and post-incentive costs for the entire time span of the business scenario, and using said computer to display said Detailed Financial Calculations, or (3) both (1) and (2).

10. A method according to claim 1, further comprising performing and displaying Financial Summary calculations and comparisons.

11. A method according to claim 1, further comprising:

between (d) and (f), (e) editing the list of candidate locations to perform at least one of the following:

delete one or more locations; add one or more locations selected from the database; or input new candidate locations; and between (h) and (l)

(i) displaying an overall cumulative score, a score per criterion for each, or both an overall cumulative score and a score per criterion for each candidate in the ranking wherein the scores reflect how well the candidates satisfy all of the criteria, an individual criterion, or both;

(j) displaying the overall cumulative score, the score per criterion, or both the overall cumulative score and the score per criterion for each candidate in the ranking based on a weighting, selected by the user, of each of the individual criterion's relative importance in the decision-making; and (k) displaying the score each candidate received based on the relative importance of the collective search criteria compared to the financial result.

12. A method according to claim 1, further comprising performing and displaying Financial Summary calculations and comparisons, and generating comparison graphs.

13. A method according to claim 1, wherein said demographic criteria are selected from labor force criteria, quality of life criteria, population criteria, and transportation criteria.

14. A method according to claim 1, wherein
said Direct Community Benefit Report includes, for the selected location and for each year of the selected business scenario, the income tax, the revenue tax, property tax, sales tax, and the total thereof,
said Indirect Community Benefit Report includes, for the selected location and for each year of the selected business scenario, the total wages and a multiplier benefit effect,
said Incentive Package Report includes, for the selected location and for each year of the selected business scenario, credits, reductions, abatements, or other assistance, offered by the location selected with regards to at least one of income tax, property tax, sales tax, training costs, labor costs, utility costs, or other miscellaneous costs for each of the years in a selected business scenario,
said Best of All Worlds analysis describes a hypothetical location that would contain in one place the best cost elements that the candidate locations collectively possess, and
said Financial Summary Report which displays a ranking of the selected candidate location sites based on post-incentive costs for the selected business scenario.

15. A method according to claim 1, further comprising, prior to saving the of candidate locations, along with their associated demographic data, economic data or both, in a Candidate Folder, (e) editing said list of candidate locations to: delete one or more locations; add one or more locations selected from the database; input new candidate locations; or combinations thereof.

16. A method according to claim 15, further comprising:
(k) displaying at least one of
(k1) an overall cumulative score, a score per criterion, or both an overall cumulative score and a score per criterion for each candidate in the ranking wherein the scores reflect how well the candidates satisfy all of the criteria and/or an individual criterion;
(k2) the overall cumulative score, the score per criterion, or both the overall cumulative score and the score per criterion for each candidate in the ranking based on a weighting, selected by the user, of each of the individual criterion's relative importance in the decision-making, and
(k3) displaying the score each candidate received based on the relative importance of the collective search criteria compared to the financial result.

* * * * *

UNITED STATES PATENT AND TRADEMARK OFFICE
CERTIFICATE OF CORRECTION

PATENT NO. : 7,640,196 B2
APPLICATION NO. : 10/505776
DATED : December 29, 2009
INVENTOR(S) : Rhett L. Weiss It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1013 days.

Signed and Sealed this

Twenty-first Day of December, 2010

David J. Kappos
*Director of the United States Patent and Trademark Office*